US010256489B2

(12) United States Patent
Kakuwa et al.

(10) Patent No.: US 10,256,489 B2
(45) Date of Patent: Apr. 9, 2019

(54) HYDROGEN GENERATING APPARATUS AND FUEL CELL SYSTEM

(71) Applicant: Panasonic Intellectual Property Management Co., Ltd., Osaka (JP)

(72) Inventors: Takashi Kakuwa, Osaka (JP); Kunihiro Ukai, Nara (JP); Tatsuo Fujita, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 308 days.

(21) Appl. No.: 15/229,115

(22) Filed: Aug. 5, 2016

(65) Prior Publication Data

US 2017/0062853 A1    Mar. 2, 2017

(30) Foreign Application Priority Data

Aug. 28, 2015  (JP) .................................. 2015-168556
Dec. 4, 2015  (JP) .................................. 2015-237413

(51) Int. Cl.
  *H01M 8/04*     (2016.01)
  *H01M 8/06*     (2016.01)
  (Continued)

(52) U.S. Cl.
  CPC .......... *H01M 8/0618* (2013.01); *B01J 8/008* (2013.01); *B01J 8/0257* (2013.01); *B01J 8/0278* (2013.01);
  (Continued)

(58) Field of Classification Search
  CPC ......... B01J 8/0492; B01J 19/248; C01B 3/38; C01B 2203/0233; C01B 2203/0244;
  (Continued)

(56) References Cited

U.S. PATENT DOCUMENTS 5,264,008 A    11/1993  Corrigan
2016/0023899 A1    1/2016  Hirakawa et al.

FOREIGN PATENT DOCUMENTS

EP         2639871      9/2013
JP       2013-182696    9/2013
(Continued)

OTHER PUBLICATIONS

English translation of WO Publication 2014-156013, Oct. 2014.*
The Extended European Search Report dated Oct. 14, 2016 for the related European Patent Application No. 16185721.4.

*Primary Examiner* — Brittany L Raymond
(74) *Attorney, Agent, or Firm* — McDermott Will & Emery LLP

(57) ABSTRACT

A hydrogen generating apparatus includes a reformer that reforms fuel and generates reformed gas containing hydrogen, a combustor that heats the reformer, an exhaust gas path which covers the surroundings of an outer wall of the reformer and through which combustion exhaust gas from the combustor flows, and a reformed gas path through which the reformed gas sent from the reformer toward the combustor flows. The reformer is arranged on a flame forming side of the combustor, and a gas flow within the reformer in a portion thereof where the gas flow contacts the outer wall of the reformer is opposed to a flow of the combustion exhaust gas in the exhaust gas path in a portion thereof where the combustion exhaust gas contacts the outer wall of the reformer.

23 Claims, 13 Drawing Sheets

(51) Int. Cl.
- H01M 8/10 (2016.01)
- H01M 8/0612 (2016.01)
- H01M 8/04014 (2016.01)
- H01M 8/04089 (2016.01)
- H01M 8/1016 (2016.01)
- C01B 3/38 (2006.01)
- B01J 8/00 (2006.01)
- B01J 8/02 (2006.01)
- H01M 8/124 (2016.01)

(52) U.S. Cl.
CPC ............ *B01J 8/0285* (2013.01); *C01B 3/38* (2013.01); *H01M 8/04014* (2013.01); *H01M 8/04022* (2013.01); *H01M 8/04097* (2013.01); *H01M 8/0631* (2013.01); *H01M 8/1016* (2013.01); *B01J 2208/0053* (2013.01); *B01J 2208/00504* (2013.01); *C01B 2203/0233* (2013.01); *C01B 2203/0244* (2013.01); *C01B 2203/0261* (2013.01); *C01B 2203/066* (2013.01); *C01B 2203/0827* (2013.01); *C01B 2203/107* (2013.01); *C01B 2203/1058* (2013.01); *C01B 2203/1064* (2013.01); *C01B 2203/1614* (2013.01); *H01M 2008/1293* (2013.01)

(58) Field of Classification Search
CPC ...... C01B 2203/0261; C01B 2203/066; C01B 2203/0827; C01B 2203/1058; C01B 2203/1064; C01B 2203/107; C01B 2203/1614; H01M 8/04014; H01M 8/04022; H01M 8/04097; H01M 8/0618; H01M 8/0631; H01M 8/1016
See application file for complete search history.

(56) References Cited

FOREIGN PATENT DOCUMENTS

| | | | |
|---|---|---|---|
| JP | 2013-191313 | | 9/2013 |
| JP | 2014-009129 | | 1/2014 |
| WO | 2009/051269 | | 4/2009 |
| WO | WO 2009-051269 | * | 4/2009 |
| WO | 2014/156013 | | 10/2014 |
| WO | WO 2014-156013 | * | 10/2014 |

* cited by examiner urn # HYDROGEN GENERATING APPARATUS AND FUEL CELL SYSTEM

BACKGROUND

1. Technical Field

The present disclosure relates to a hydrogen generating apparatus and a fuel cell system.

2. Description of the Related Art

Japanese Unexamined Patent Application Publication No. 2014-9129 discloses a fuel cell system in which a combustor is arranged at the center of an apparatus, a combustion space is secured on the flame forming side of the combustor, and a reformer is arranged in a surrounding relation to both the combustor and the combustion space. In the proposed fuel cell system, the reformer can be uniformly heated by forming an exhaust gas path to turn around in such a way that combustion exhaust gas of the combustor passes through the reformer.

Japanese Unexamined Patent Application Publication No. 2013-182696 proposes a structure in which a combustor and a fuel cell are arranged at the center of a fuel cell system, and in which a reformer, an air heat exchanger, etc. are arranged in a multiwall cylindrical shape in a surrounding relation to both the combustor and the fuel cell.

Japanese Unexamined Patent Application Publication No. 2013-191313 proposes a structure in which an outlet of a SOFC (Solid Oxide Fuel Cell) stack is employed as a combustor, and in which a guide is provided to guide combustible gas or combustion exhaust gas toward an upper wall of a reformer to increase heat exchangeability between the upper wall of the reformer and the combustible gas or the combustion exhaust gas, thereby improving performance in receiving heat from the upper wall of the reformer.

SUMMARY

However, reduction in size and cost of the apparatus has not been sufficiently studied in the related art. One non-limiting and exemplary embodiment provides a hydrogen generating apparatus and a fuel cell system, which can realize further reduction in size and cost in comparison with the related art.

In one general aspect, the techniques disclosed here feature a hydrogen generating apparatus including a reformer that reforms fuel and generates reformed gas containing hydrogen, a combustor that heats the reformer, an exhaust gas path which covers the surroundings of an outer wall of the reformer and through which combustion exhaust gas from the combustor flows, and a reformed gas path through which the reformed gas sent from the reformer toward the combustor flows, wherein the reformer is arranged on a flame forming side of the combustor, and a gas flow within the reformer in a portion thereof where the gas flow contacts the outer wall of the reformer is opposed to a flow of the combustion exhaust gas in the exhaust gas path in a portion thereof where the combustion exhaust gas contacts the outer wall of the reformer.

The hydrogen generating apparatus and the fuel cell system according to one aspect of the present disclosure can realize further reduction in size and cost in comparison with the related art.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
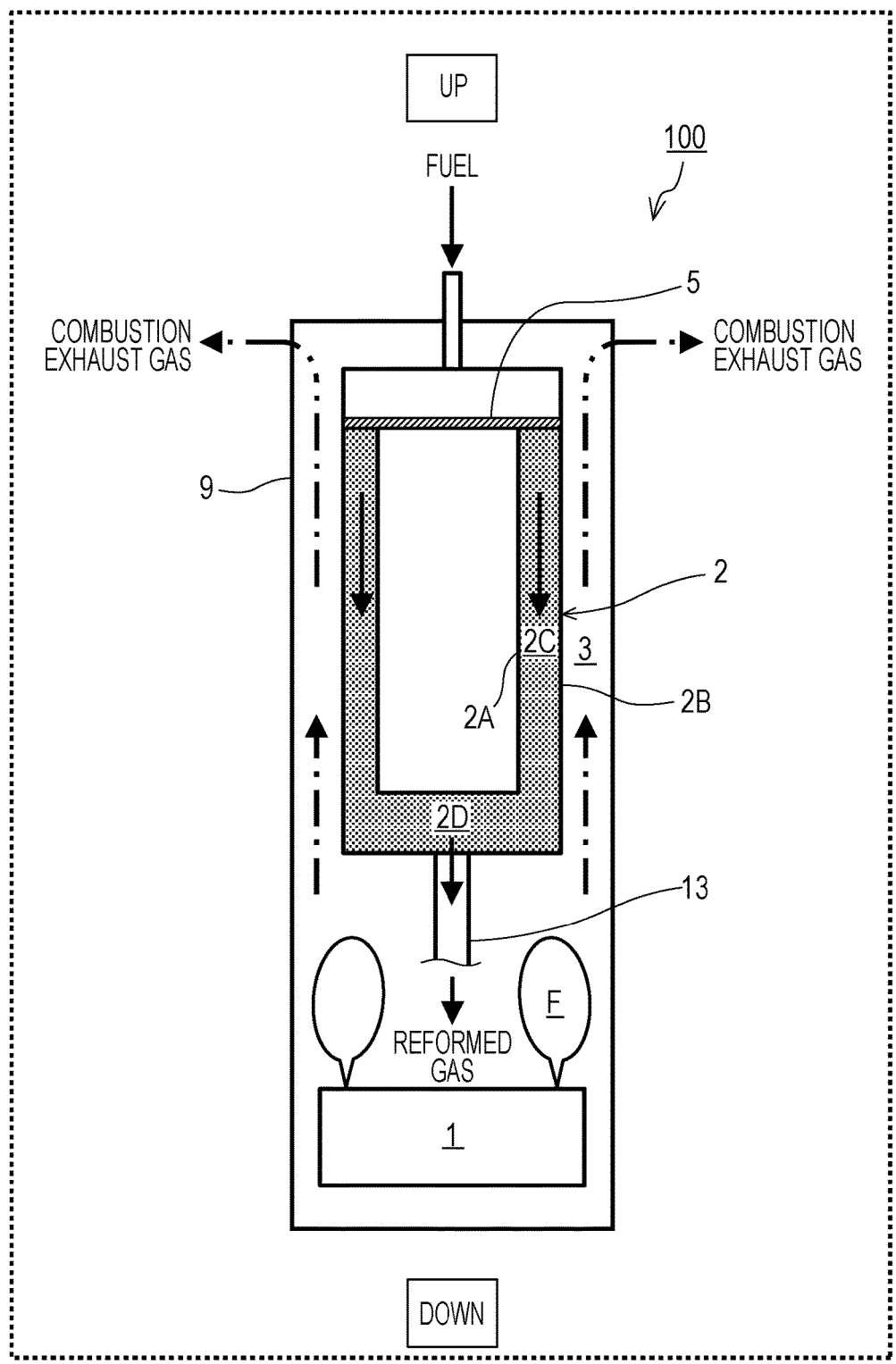
FIG. 1 illustrates an exemplary hydrogen generating apparatus according to a first embodiment.

As a result of intensively addressing the challenge of reducing the size and the cost of a hydrogen generating apparatus and a fuel cell system, the inventors have found the following points.

In the case of installing the fuel cell system at any appropriate place, there is a possibility that, depending on a projected area of the fuel cell system, limitations often occur in requirements of location where the fuel cell system can be installed. When the fuel cell system is installed at home, for example, the fuel cell system is installed along a house wall in many cases, and a limitation in the requirements of location tends to occur in the depth direction of the fuel cell system. In such a case, reduction in thickness (size) of the fuel cell system is needed. In trying to reduce the size of the fuel cell system, it is unavoidable to further reduce the sizes of a reformer, a fuel cell (hot module), etc., which are large-capacity components contained in the fuel cell system, (more specifically, to reduce the sizes of individual units in the depth direction).

However, with the techniques disclosed in Japanese Unexamined Patent Application Publication No. 2014-9129, because the reformer and the exhaust gas path through which the combustion exhaust gas flows are arranged outside the combustor, it is deemed that there is a limit in reducing the apparatus size in the depth direction, and that further reduction in size of the fuel cell system is difficult to realize.

With the techniques disclosed in Japanese Unexamined Patent Application Publication No. 2013-182696, because an evaporator, the reformer, and the air heat exchanger are arranged in a multiwall cylindrical shape around the combustor, the apparatus size in the depth direction is given as a value resulting from adding, to the diameter of the combustor, respective thicknesses corresponding to predetermined spacings at which a plurality of cylindrical wall members are arranged. It is hence deemed that there is a limit in reducing the apparatus size in the depth direction, and that further reduction in size of the fuel cell system is difficult to realize. Moreover, in Japanese Unexamined Patent Application Publication No. 2013-182696, the manufacturing cost is increased because of the necessity of arranging the plurality of cylindrical wall members with high accuracy and carrying out welding operations. Hence it is also deemed that a difficulty occurs in realizing the cost reduction.

Stated in another way, the inventors have found that the inventions disclosed in Japanese Unexamined Patent Application Publications No. 2014-9129 and No. 2013-182696 still have room for improvement with regard to reduction in size and cost of the hydrogen generating apparatus and the fuel cell system, and have conceived the following aspect of the present disclosure.

A hydrogen generating apparatus according to a first aspect of the present disclosure includes a reformer that reforms fuel and generates reformed gas containing hydrogen, a combustor that heats the reformer, an exhaust gas path which covers the surroundings of an outer wall of the reformer and through which combustion exhaust gas from the combustor flows, and a reformed gas path through which the reformed gas sent from the reformer toward the combustor flows, wherein the reformer is arranged on a flame forming side of the combustor, and a gas flow within the reformer in a portion thereof where the gas flow contacts the outer wall of the reformer is opposed to a flow of the combustion exhaust gas in the exhaust gas path in a portion thereof where the combustion exhaust gas contacts the outer wall of the reformer.

With the features described above, the hydrogen generating apparatus according to the first aspect of the present disclosure can realize further reduction in size and cost in comparison with the related art. More specifically, since the reformed gas is sent to the combustor with the reformer being arranged on the flame forming side of the combustor, a projected area of the hydrogen generating apparatus is smaller than that in the case of arranging the reformer around the combustor. Thus, the hydrogen generating apparatus has a simple structure not including any projection, etc. protruding in the depth direction, and reduction in size and cost of the hydrogen generating apparatus can be realized.

Furthermore, since the gas flow within the reformer is opposed to the flow of the combustion exhaust gas, efficiency of heat exchange between both the gases is improved in comparison with the case of using any of a parallel-flow heat exchanger and a crossflow heat exchanger.

In addition, since an outlet of the reformer is heated by combustion heat of the combustor, it is possible to control an outlet temperature of the reformer to be high and an inlet temperature thereof to be low, and to increase reforming efficiency of the reformer.

The hydrogen generating apparatus according to a second aspect of the present disclosure is featured in that, in the hydrogen generating apparatus according to the first aspect, the reformer includes a sidewall portion that is formed by the outer wall and an inner wall.

With the feature described above, a thickness of the side wall portion is set to an appropriate value, and heat of the combustion exhaust gas is sufficiently transferred to the entirety of the reforming catalyst in the side wall portion.

The hydrogen generating apparatus according to a third aspect of the present disclosure is featured in that, in the hydrogen generating apparatus according to the second aspect, the inner wall and the outer wall are each a circular cylindrical body.

With the feature described above, in comparison with the case of using, e.g., rectangular cylindrical bodies to constitute the sidewall portion of the reformer, a length and the number of points along and at which welding is to be made in manufacturing can be reduced, and hence the manufacturing cost of the reformer can be reduced. Furthermore, resistance to gas pressure and resistance to thermal stress are improved, and a thickness of a plate constituting the circular cylindrical body can be reduced. As a result, cost reduction of the hydrogen generating apparatus can be realized.

Embodiments, examples, and modifications of the present disclosure will be described below with reference to the accompanying drawings.

It is to be noted that the embodiments, examples, and the modifications described below represent specific examples of the present disclosure. Numerical values, shapes, materials, components, and layout positions and connection forms of the components, which are described in the following, are merely illustrative, and they are not purported to limit the present disclosure. Among the components in the following, those ones not stated in independent claims, which define most significant concepts, are described as optional components. Description of the components denoted by the same reference symbols in the drawings is not repeated in some cases. The drawings are intended to depict the components in a schematic manner for easier understanding, and shapes, dimensional ratios, etc. are not exactly depicted in some cases.

(First Embodiment)
[Apparatus Configuration]

FIG. 1 illustrates an exemplary hydrogen generating apparatus according to a first embodiment. For convenience of explanation, it is assumed that "up" and "down" are defined as denoted in the drawings, and that gravity acts from the "up" side toward the "down" side.

In the example of FIG. 1, a hydrogen generating apparatus 100 includes a reformer 2, a combustor 1, an exhaust gas path 3, and a reformed gas path 13.

The reformer 2 reforms fuel and generates reformed gas containing hydrogen. While, in this embodiment, the reformer 2 includes a sidewall portion 2C formed by an inner wall 2A and an outer wall 2B, the reformer 2 may not include in some cases such a sidewall portion that defines a space inside the reformer 2. With the structure in which the reformer 2 has the sidewall portion 2C and a thickness of the sidewall portion 2C is set to an appropriate value, heat is more easily transferred from combustion exhaust gas to the entirety of a reforming catalyst in the sidewall portion 2C. A practical example will be described below.

The sidewall portion 2C of the reformer 2 is constituted in an annular shape when looked at in a plan view in the up-down direction. An outer shell of the reformer 2 is made of, e.g., a metal material such as stainless steel.

In this embodiment, the inner wall 2A and the outer wall 2B are each a circular cylindrical body (namely, the sidewall portion 2C is in the form of a circular ring when looked at in a plan view in the up-down direction). Accordingly, in comparison with the case of using, e.g., rectangular cylindrical bodies to constitute the sidewall portion of the reformer 2, a length and the number of points along and at which welding is to be made in manufacturing can be reduced, and hence the manufacturing cost of the reformer 2 can be reduced. Furthermore, resistance to gas pressure and resistance to thermal stress are improved, and a thickness of a plate constituting the circular cylindrical body can be reduced. As a result, cost reduction of the hydrogen generating apparatus 100 can be realized.

In this embodiment, the reforming catalyst is filled in each of the sidewall portion 2C and a bottom portion 2D of the reformer 2. A lower end region of the sidewall portion 2C is communicated with the bottom portion 2D, and an upper end region of the sidewall portion 2C is covered with a peripheral portion of a plate member 5. A plurality of openings (not illustrated) for allowing fuel to pass therethrough are formed in the peripheral portion of the plate member 5. A region between the plate member 5 and a top cover of the reformer 2, and the inner side of the inner wall 2A are each defined as a space. The top cover is connected to a fuel supply path.

A reforming reaction in the reformer 2 may be of any type. The reforming reaction may be, e.g., a steam reforming reaction, an autothermal reaction, or a partial oxidation reaction. In general, at least one selected from among a group consisting of noble metal catalysts, such as Pt, Ru and Rh, and Ni can be used as a catalyst metal of the reforming catalyst. Though not illustrated in FIG. 1, devices to be used in developing the above-described reforming reaction are disposed as appropriate. For example, when the reforming reaction is the steam reforming reaction, an evaporator for supplying steam to the reformer 2, a water supplier for supplying water to the evaporator, etc. are disposed. When the reforming reaction is the autothermal reaction, an air supplier for supplying air to the reformer 2 is further disposed in the hydrogen generating apparatus 100.

Fuel to be fed to the reformer 2 may be one of fuel gases containing organic compounds made up of at least carbons and hydrogens, such as city gas, natural gas, and LPG in each of which methane is a main constituent, or one of fuels such as alcohols, bio fuels, and light oil.

The combustor 1 heats the reformer 2. The combustor 1 may be of any suitable type insofar as the combustor 1 is able to heat the reformer 2. In this embodiment, the reformer 2 is arranged on the flame forming side of the combustor 1 where flames F are formed. With such an arrangement, the reformer 2 is heated up to a temperature (e.g., about 600° C. to 700° C.) suitable for the reforming reaction by heat of the flames F of the combustor 1, heat of the combustion exhaust gas flowing in an exhaust gas path 3, etc.

The combustor 1 is constituted in the form of, e.g., a hollow housing. Several tens fuel blowout openings (not illustrated; e.g., circular holes) are substantially evenly formed in a peripheral portion of an upper wall of the housing. Therefore, the fuel inside the housing of the combustor 1 is evenly distributed through the fuel blowout openings and is blown out upward. The fuel for the combustor 1 may be of any suitable type. For example, when the hydrogen generating apparatus 100 is assembled into a fuel cell system, off-gas of a fuel cell may be used as the fuel for the combustor 1. In such a case, anode off-gas (reformed gas) and cathode off-gas (air), which have not contributed to a power generating action in the fuel cell, are burnt in the combustor 1. Details will be described below in a second embodiment.

The exhaust gas path 3 is a flow path which covers the surroundings of the outer wall 2B of the reformer 2, and through which the combustion exhaust gas from the combustor 1 flows. In this embodiment, the exhaust gas path 3 is formed between the outer wall 2B of the reformer 2 and a housing 9 of the hydrogen generating apparatus 100. The combustion exhaust gas flows in the exhaust gas path 3 upward from below, and is then discharged to the outside of the hydrogen generating apparatus 100 through combustion exhaust gas outlets (not illustrated) that are formed in a wall of the housing 9 at appropriate positions.

The reformed gas path 13 is a flow path through which the reformed gas to be sent from the reformer 2 toward the combustor 1 flows. The reformed gas path 13 may be constituted to extend downward straightforward and to pass through the combustor 1. Details of the configuration of the reformed gas path 13 will be described below in Examples.

[Operation]

One example of operation of the hydrogen generating apparatus 100 according to this embodiment will be described below with reference to FIG. 1.

The fuel to be reformed is supplied from a fuel supply path, which is communicated with a fuel supplier (not illustrated), to the side wall portion 2C of the reformer 2 through the plate member 5. At that time, a gas flow within the reformer 2 in a portion thereof where the gas flow contacts the outer wall 2B (i.e., within the side wall portion 2C in this embodiment) is opposed to a flow of the combustion exhaust gas flowing in the exhaust gas path 3 in a portion thereof where the combustion exhaust gas contacts the outer wall 2B. Accordingly, the reformer 2 is heated by the heat of the combustion exhaust gas. As a result, the reforming catalyst disposed in the side wall portion 2C is heated up to a temperature suitable for the reforming reaction, whereby the reformed gas containing hydrogen is generated through fuel reforming with the reforming catalyst. The reformed gas flows through the reforming catalyst downward from above, and is then collected at an upper end portion of the reformed gas path 13. After flowing in the reformed gas path 13 from the upper end portion thereof toward the combustor 1 (i.e., downward), the reformed gas is utilized in an appropriate hydrogen utilizing device (e.g., a fuel cell).

With the configuration described above, the hydrogen generating apparatus 100 of this embodiment can be reduced in size and cost in comparison with the related art. More specifically, since the reformed gas is sent toward the combustor 1 with the reformer 2 being arranged on the flame forming side of the combustor 1 where the flames F are formed, a projected area of the hydrogen generating apparatus 100 is smaller than that in the case of arranging the reformer around the combustor. Thus, the hydrogen generating apparatus 100 has a simple structure not including any projection, etc. protruding in the depth direction, and reduction in size and cost of the hydrogen generating apparatus 100 can be realized.

Furthermore, since the gas flow within the reformer 2 is opposed to the flow of the combustion exhaust gas, efficiency of heat exchange between both the gases is improved in comparison with the case of using any of a parallel-flow heat exchanger and a crossflow heat exchanger.

Since an outlet of the reformer 2 is heated by combustion heat of the combustor 1, it is possible to control an outlet temperature of the reformer 2 to be high and an inlet temperature thereof to be low, and to increase reforming closer to the bottom portion 2D of the reformer 2 above the combustor 1, and the reformer 2 is heated at the bottom portion 2D by the combustion heat of the combustor 1. Accordingly, the outlet of the reformer 2 can be easily controlled to a maximum temperature (e.g., about 600° C. to 700° C.). A conversion rate of the reforming reaction in the reformer 2 depends on temperature, and controlling the outlet temperature of the reformer 2 to the maximum temperature is advantageous in effectively promoting the reforming reaction that is an endothermal reaction, and in increasing the reforming efficiency of the reformer 2.

Since the reforming catalyst is disposed in the side wall portion 2C, the hydrogen generating apparatus 100 can be constituted such that the heat of the combustion exhaust gas is sufficiently transferred to the entirety of the reforming catalyst while the reforming catalyst is disposed in an appropriate amount. In this embodiment, the spacing between the inner wall 2A and the outer wall 2B (i.e., the thickness of the side wall portion 2C) is set to about 10 mm such that the heat of the combustion exhaust gas is sufficiently transferred to the entirety of the reforming catalyst while a needed amount (e.g., about 200 g) of the reforming catalyst is disposed in the reformer 2.

EXAMPLES

Figure 2:
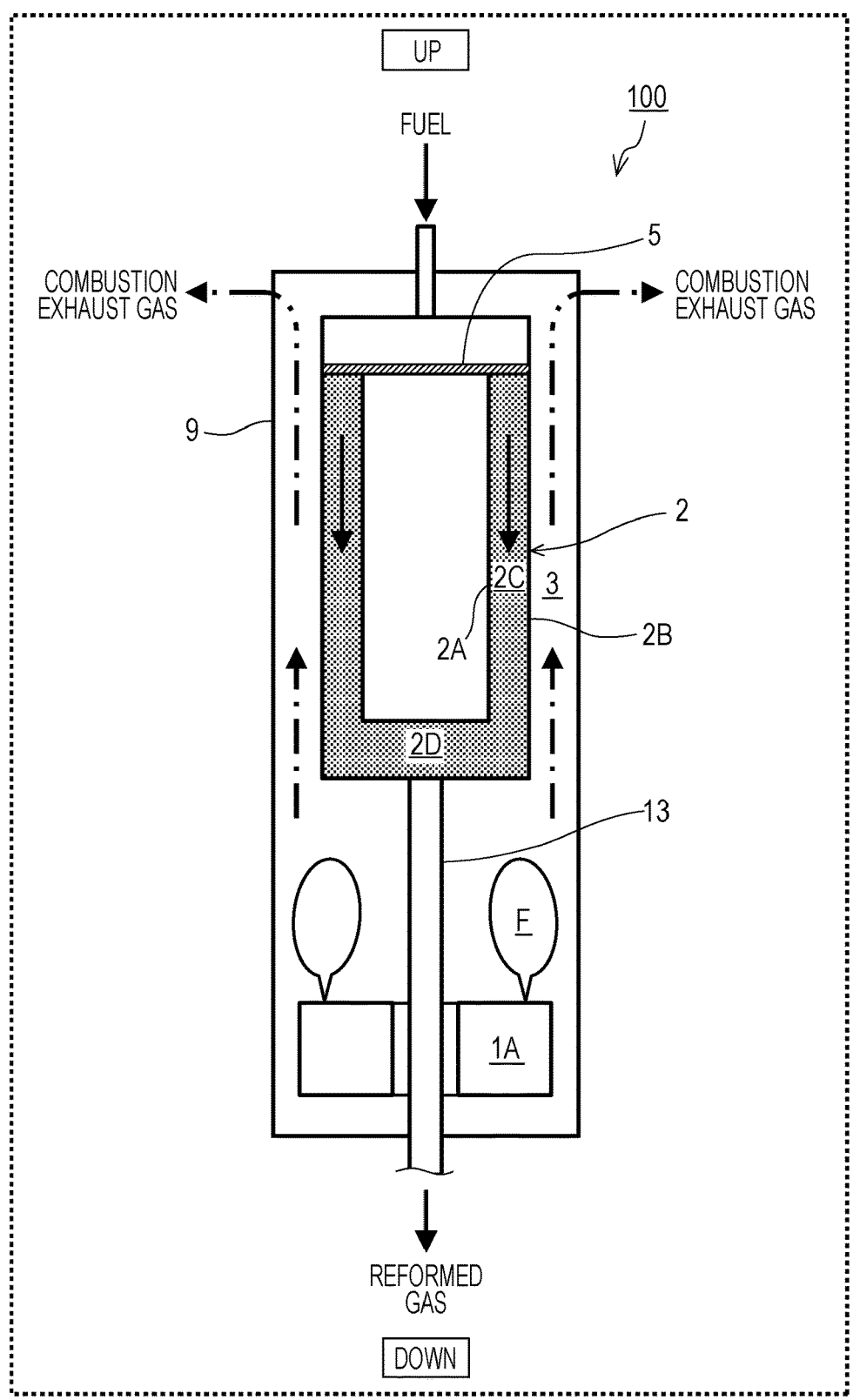
FIG. 2 illustrates an exemplary hydrogen generating apparatus according to an example of the first embodiment.

FIG. 2 illustrates an exemplary hydrogen generating apparatus according to an example of the first embodiment.

In the example of FIG. 2, a hydrogen generating apparatus 100 includes a reformer 2, a combustor 1A, an exhaust gas path 3, and a reformed gas path 13A. The reformer 2 and the exhaust gas path 3 are similar to those in the first embodiment, and hence detailed description thereof is omitted.

The hydrogen generating apparatus 100 of this example is constituted such that, in the hydrogen generating apparatus 100 according to the second or third aspect, the combustor 1A is a circular ring body, and the reformed gas path 13A passes through an inner space of the circular ring body. More specifically, the combustor 1A includes inner and outer walls each having a circular cylindrical shape and extending vertically, an upper wall having a disk-like shape and covering a region between the inner wall and the outer wall from above, and a lower wall having a circular ring shape and covering the above-mentioned region from below. A pipe constituting the reformed gas path 13A penetrates through the inner side of the inner wall of the combustor 1A. Fuel blowout openings are formed in the upper wall of the combustor 1A at appropriate positions substantially evenly in the circumferential direction.

As described above, in the hydrogen generating apparatus 100 of this example, the reformed gas can be heated by the heat of the flames F of the combustor 1A, the radiant heat of the combustor 1A, etc. in a way capable of appropriately suppressing dissipation of heat of the reformed gas that flows in the reformed gas path 13A.

If the reformed gas path 13A does not pass through the inner space of the combustor 1A (circular ring body), the reformed gas path needs to be routed to pass laterally of the combustor. This may lead to a possibility that the projected area of the hydrogen generating apparatus increases. In the hydrogen generating apparatus 100 of this example, the above possibility can be reduced with the configuration described above.

(First Modification)

Figure 3:
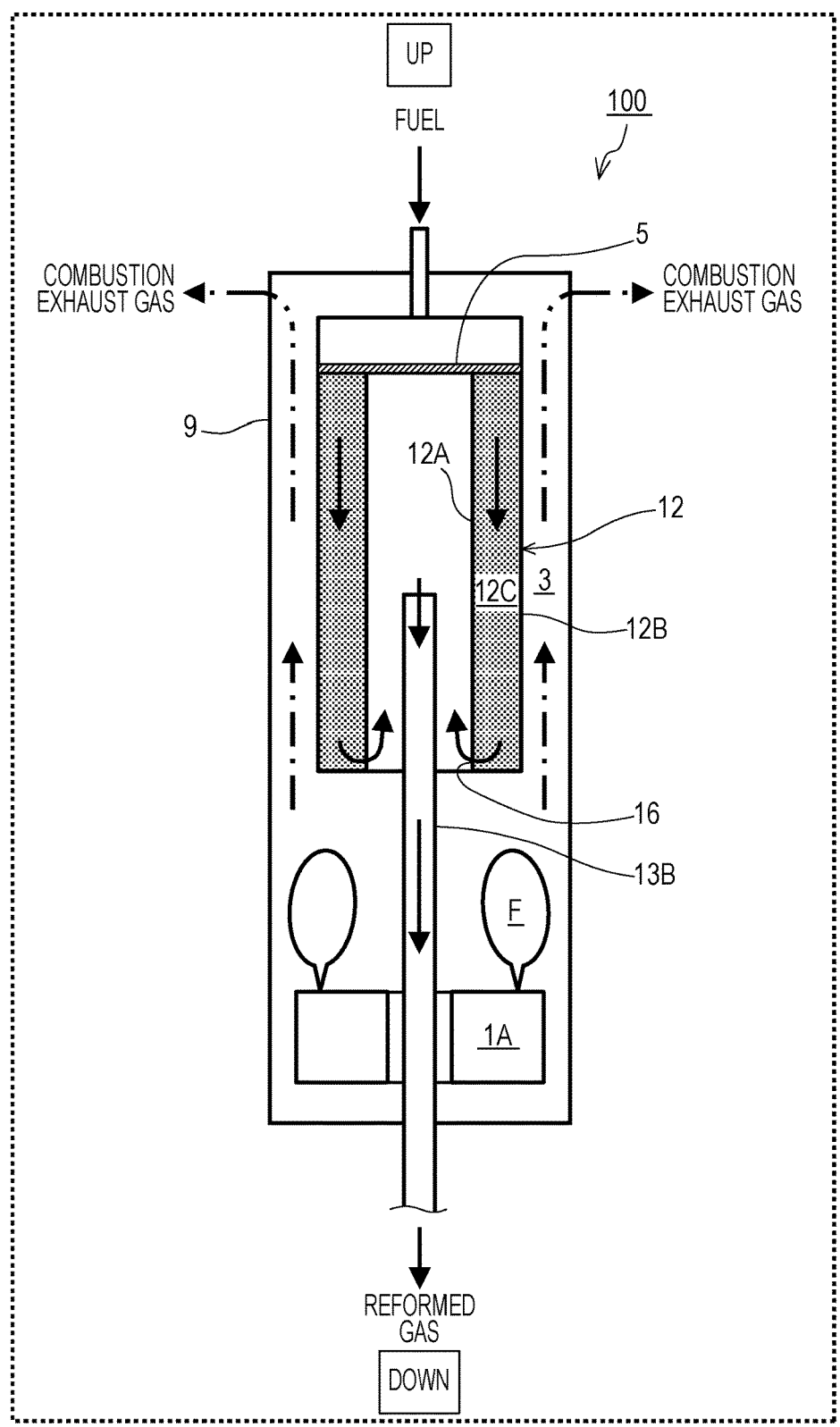
FIG. 3 illustrates an exemplary hydrogen generating apparatus according to a first modification of the first embodiment.

FIG. 3 illustrates an exemplary hydrogen generating apparatus according to a first modification of the first embodiment.

In the example of FIG. 3, a hydrogen generating apparatus 100 includes a reformer 12, a combustor 1A, an exhaust gas path 3, and a reformed gas path 13B. The exhaust gas path 3 is similar to that in the first embodiment, and hence detailed description thereof is omitted. The combustor 1A is similar to that in the above-mentioned example of the first embodiment, and hence detailed description thereof is omitted.

The hydrogen generating apparatus 100 of this modification is constituted such that, in the hydrogen generating apparatus 100 according to any of the second aspect, the third aspect, and the example of the first embodiment, the reformed gas from the reforming catalyst disposed in a side wall portion 12C is sent to the reformed gas path 13B after being turned around at the inner wall 12A of the reformer 12.

More specifically, the reformed gas flows through the side wall portion 12C downward from above, and after passing a turning-around portion 16 provided in the inner wall 12A, the reformed gas flows through the inner space of the reformer 12 upward from below. Thereafter, the reformed gas is collected toward an upper end portion of the reformed gas path 13B to turn around again, and flows through the inside of the reformed gas path 13B from the upper end portion thereof toward the combustor 1A (i.e., downward).

Here, a lower end region between the inner wall 12A and the outer wall 12B is covered with a peripheral portion of a plate member, and the turning-around portion 16 is provided near a lower end portion of the inner wall 12A. The turning-around portion 16 includes a plurality of openings (not illustrated) formed along the circumference of the inner wall 12A. The openings are each formed in the inner wall 12A in size (e.g., a diameter of about 1 to 3 mm in the case of a circular hole) allowing passage of the reformed gas, but blocking-off passage of catalyst particles of the reforming catalyst therethrough. Moreover, a pipe constituting the reformed gas path 13B penetrates through the above-mentioned plate member in an airtight fashion, and extends within the inner space of the reformer 12 upward.

As described above, in the hydrogen generating apparatus 100 of this modification, the reformed gas heated up to the temperature (e.g., about 600° C. to 700° C.) suitable for the reforming reaction turns around at the turning-around portion 16 and then ascends. While the reformed gas flows in such a manner, the reforming catalyst is heated from the inner side by the heat of the reformed gas at the high temperature. Accordingly, the occurrence of variations in temperature of the reforming catalyst can be appropriately suppressed in combination with the above-described configuration of heating the reforming catalyst from the outer side with the heat of the combustion exhaust gas.

(Second Modification)

Figure 4:
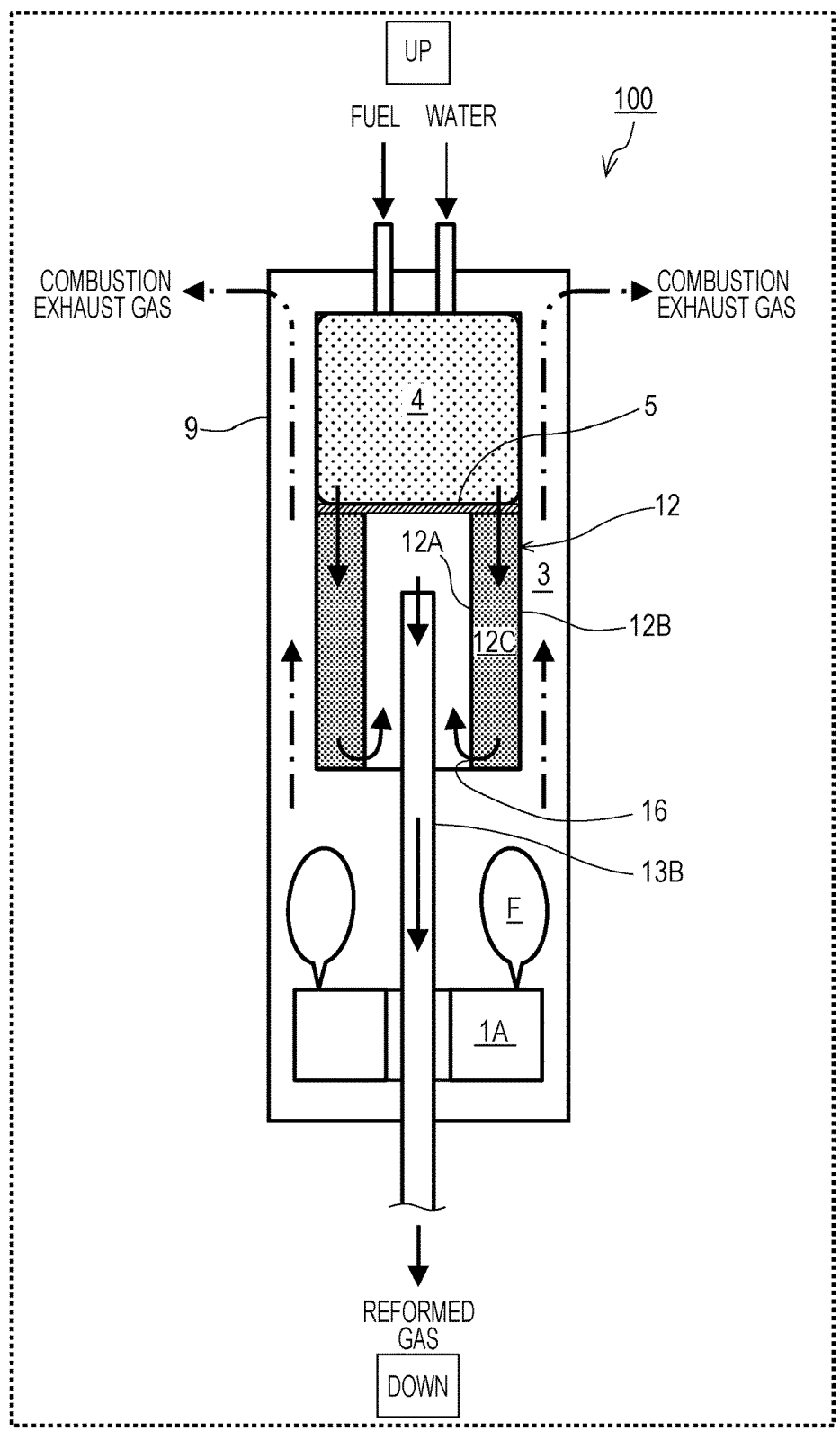
FIG. 4 illustrates an exemplary hydrogen generating apparatus according to a second modification of the first embodiment.

FIG. 4 illustrates an exemplary hydrogen generating apparatus according to a second modification of the first embodiment.

In the example of FIG. 4, a hydrogen generating apparatus 100 includes a reformer 12, a combustor 1A, an exhaust gas path 3, a reformed gas path 13B, and an evaporator 4. The exhaust gas path 3 is similar to that in the first embodiment, and hence detailed description thereof is omitted. The combustor 1A is similar to that in the above-mentioned example of the first embodiment, and hence detailed description thereof is omitted. The reformer 12 and the reformed gas path 13B are similar to those in the first modification of the first embodiment, and hence detailed description thereof is omitted.

The hydrogen generating apparatus 100 of this modification is constituted such that, in the hydrogen generating apparatus 100 according to any of the first to third aspects, and the example and the first modification of the first embodiment, the evaporator 4 generates steam used to carry out the steam reforming of fuel in the reformer 12 through heat exchange with the combustion exhaust gas, and that the evaporator 4 is arranged in contact with the reformer 12. Moreover, the evaporator 4 is arranged downstream of the reformer 12 in the flow direction of the combustion exhaust gas.

The evaporator 4 may be of any suitable type insofar as the evaporator 4 is arranged in contact with the reformer 12. For example, as illustrated in FIG. 4, the evaporator 4 and the reformer 12 may be arranged in the mentioned order in the direction downward from above, and a lower end portion of the evaporator 4 may be in contact with an upper end portion of the reformer 12 with the plate member 5 interposed therebetween. Alternatively, the evaporator 4 and the reformer 12 may be in contact with each other in such a layout that a side wall portion of the evaporator 4 and a side wall portion of the reformer are bonded to each other with a desired spacing kept therebetween in the up-down direction by employing a vertical member (not illustrated).

Here, water from a water supplier (not illustrated) and fuel from a fuel supplier (not illustrated) are sent to the evaporator 4. At that time, the water flowing through the evaporator 4 is heated up to a high temperature and is evaporated by the heat of the combustion exhaust gas. A gaseous mixture of the fuel and the steam having passed through the evaporator 4 and the plate member 5 is then supplied to the reforming catalyst. As a result, the steam reforming of the fuel can be performed in the reformer 12.

As described above, in the hydrogen generating apparatus 100 of this modification, since the evaporator 4 and the reformer 12 are arranged in contact with each other, the apparatus configuration is simplified. More specifically, since the evaporator 4 and the reformer 12 are integrally arranged side by side in the up-down direction, the hydrogen generating apparatus 100 can be provided in a simpler configuration than that in the case of arranging the evaporator and the reformer separately.

Furthermore, since the reforming reaction is performed with the combustion exhaust gas at high temperature immediately after exiting the combustor 1A and water is evaporated with the combustion exhaust gas having passed through the reformer 12 and having been cooled down to a relatively low temperature, heat in the hydrogen generating apparatus 100 can be effectively utilized. In other words, since the temperature suitable for the reforming reaction and the temperature suitable for the water evaporation are at levels lowering in the mentioned order, the heat of the combustion exhaust gas can be effectively utilized by causing the combustion exhaust gas to flow as described above.

(Second Embodiment)

Figure 5:
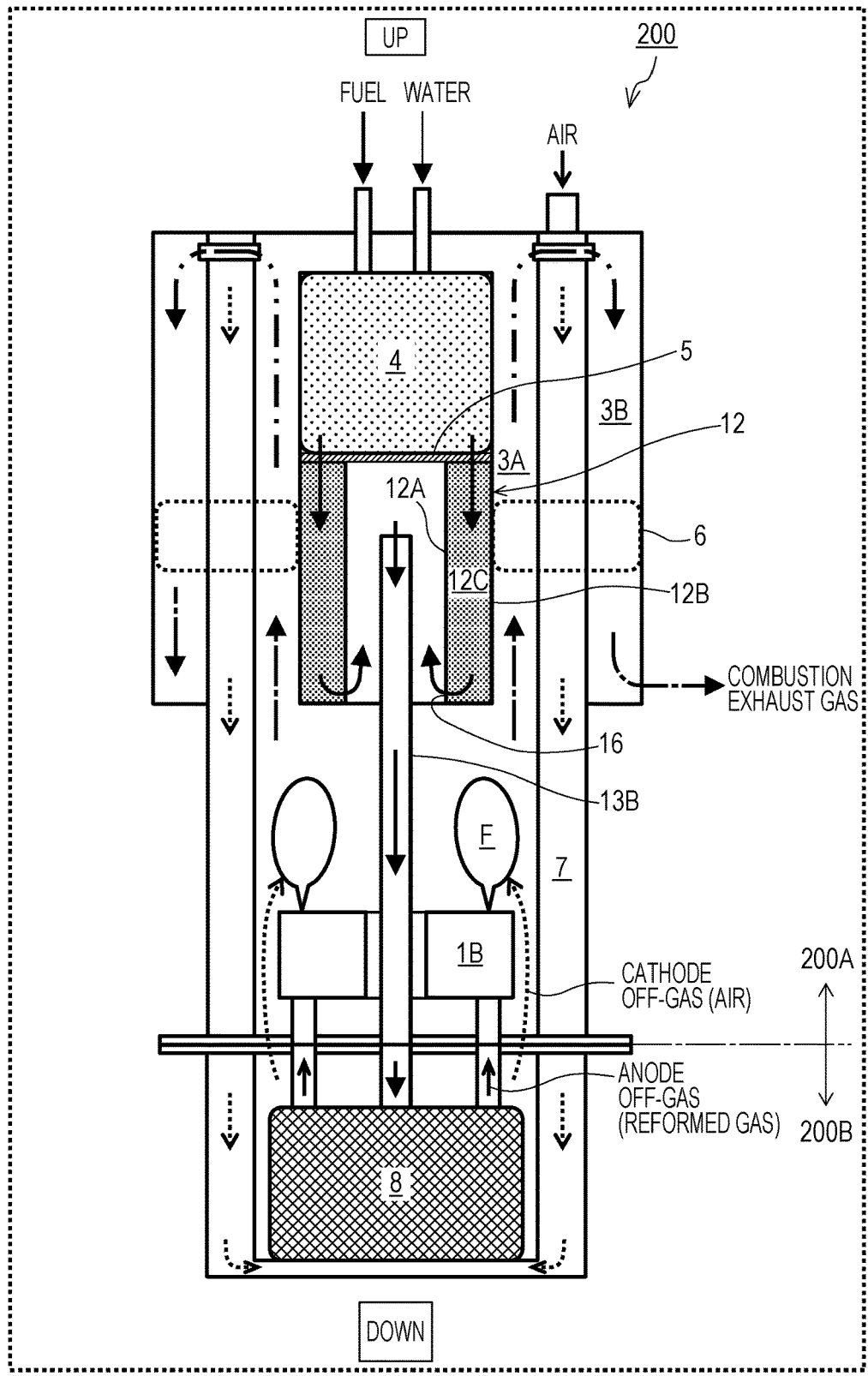
FIG. 5 illustrates an exemplary fuel cell system according to a second embodiment.

FIG. 5 illustrates an exemplary fuel cell system according to a second embodiment.

In the example of FIG. 5, a fuel cell system 200 includes a reformer 12, a combustor 1B, a first exhaust gas path 3A, a second exhaust gas path 3B, a reformed gas path 13B, an evaporator 4, an air heat exchanger 6, an air supply path 7, and a fuel cell 8.

The reformer 12 reforms fuel through the steam reforming and generates reformed gas containing hydrogen. While, in this embodiment, the reformer 12 includes a sidewall portion 12C formed by an inner wall 12A and an outer wall 12B, it may not include in some cases such a sidewall portion that defines a space inside the reformer 12, as described above.

The inner wall 12A and the outer wall 12B are each, for example, a circular cylindrical body, as described above.

The reformed gas path 13B is a flow path through which the reformed gas to be sent from the reformer 12 toward the combustor 1B flows. The evaporator 4 generates steam that is used to carry out the steam reforming of fuel in the reformer 12 through heat exchange with the combustion exhaust gas.

The reformer 12 is arranged on the flame forming side of the combustor 1B where flames F are formed.

Here, the first exhaust gas path 3A is a flow path covering the surroundings of the outer wall 12B of the reformer 12 and allowing the combustion exhaust gas from the combustor 1B to flow therethrough. A gas flow within the reformer 12 in a portion thereof where the gas flow contacts the outer wall 12B of the reformer 12 (i.e., within the side wall portion 12C in this embodiment) is opposed to a flow of the combustion exhaust gas in the first exhaust gas path 3A in a portion thereof where the combustion exhaust gas contacts the outer wall 12B of the reformer 12.

The reformer 12, the reformed gas path 13B, and the evaporator 4 are similar to those in the first embodiment, and hence detailed description thereof is omitted.

In the fuel cell system 200 of this embodiment, the combustor 1B is a circular ring body, and the reformed gas path 13B passes through an inner space of the circular ring body. That configuration and the advantageous effects obtained with that configuration are similar to those in the first embodiment, and hence detailed description thereof is omitted.

Furthermore, the fuel cell system 200 is constituted such that the reformed gas from the reforming catalyst, which is disposed in the side wall portion 12C of the reformer 12, is sent to the reformed gas path 13B after being turned around at the inner wall 12A of the reformer 12. That configuration and the advantageous effects obtained with that configuration are similar to those in the first embodiment, and hence detailed description thereof is omitted.

In addition, the fuel cell system 200 is constituted such that the evaporator 4 is arranged in contact with the reformer 12, and that the evaporator 4 is arranged downstream of the reformer 12 in the flow direction of the combustion exhaust gas. That arrangement of the evaporator 4 and the advantageous effects obtained with that arrangement are similar to those in the first embodiment, and hence detailed description thereof is omitted.

The air heat exchanger 6 includes the air supply path 7, which has a cylindrical shape and which is arranged around an outer periphery of the first exhaust gas path 3A, to perform heat exchange between air flowing in the air supply path 7 and the combustion exhaust gas flowing in the first exhaust gas path 3A. In other words, the heat exchange in the air heat exchanger 6 is carried out in a state where the air flowing in the air supply path 7 serves as a heat receiving fluid and the combustion exhaust gas flowing in the first exhaust gas path 3A serves as a heating fluid.

In this embodiment, the first exhaust gas path 3A is defined between the outer wall 12B of the reformer 12 and a cylindrical inner wall of the air supply path 7, and the second exhaust gas path 3B is defined around a cylindrical outer wall of the air supply path 7. The combustion exhaust gas from the combustor 1B flows through the first exhaust gas path 3A, and after passing through a pipe horizontally penetrating the air supply path 7, further flows through the second exhaust gas path 3B.

When air supplied at an ordinary temperature from an air supplier (not illustrated) flows in the air supply path 7 downward from above, the air is heated through heat exchange with the combustion exhaust gas flowing in the first exhaust gas path 3A upward from below. At the same time, the air is heated through heat exchange with the combustion exhaust gas flowing in the second exhaust gas path 3B downward from above. Accordingly, the air at the ordinary temperature is heated up to an appropriate temperature (e.g., about 600° C. to 700° C.). The air is further heated to a temperature suitable for the power generating reaction in the fuel cell 8 with the aid of reaction heat generated upon internal reforming of the fuel cell 8, and is supplied to the fuel cell 8 via a lower portion of a container 200B that contains the fuel cell 8. On that occasion, the combustion exhaust gas is cooled down to an appropriate temperature (e.g., about 300° C.). Thereafter, the combustion exhaust gas is sent to a heat exchanger (not illustrated) that generates, e.g., hot water for hot-water supply.

On the other hand, the reformed gas flowing in the second exhaust gas path 13B is supplied to the fuel cell 8 through a path disposed above the container 200B.

Thus, the fuel cell 8 generates electric power by employing the air supplied through the air supply path 7 and the reformed gas supplied through the reformed gas path 13B. Stated in another way, the power generating reaction is developed inside the fuel cell 8 with hydrogen in the reformed gas and oxygen in the air, and a current is taken out from the fuel cell 8.

The fuel cell 8 may be of any suitable type. One example of the fuel cell 8 is a solid oxide fuel cell, but the fuel cell 8 is not limited to that type. Another example of the fuel cell 8 is a flat-plate stack constituted by stacking individual members such as flat-plate cells and interconnectors, but the fuel cell 8 is not limited to that type. The flat-plate stack includes, e.g., a reformed gas path through which reformed gas flows, an air supply path through which air flows, a stack temperature detector for detecting an operating temperature of the stack, an electrode from which electric power is taken out, and so on. However, because those components are similar to those used in a general flat-plate fuel cell, drawings and detailed description thereof are omitted.

The combustor 1B heats the reformer 12. The combustor 1B may be of any suitable type insofar as the combustor 1B is able to heat the reformer 12. In this embodiment, the combustor 1B burns the anode off-gas (reformed gas) and the cathode off-gas (air), each of which has not contributed to the power generating action in the fuel cell 8. More specifically, as illustrated in FIG. 5, an anode off-gas path is connected to a lower wall portion of a housing of the combustor 1B. A cathode off-gas path is formed between a lateral surface of the housing of the combustor 1B and the cylindrical inner wall of the air supply path 7. With such an arrangement, the air passing laterally of the housing of the combustor 1B is mixed with the reformed gas flowing out of fuel blowout openings of the combustor 1B, and a gaseous mixture is burnt, whereby the flames F are formed at the fuel blowout openings.

With the configuration described above, the fuel cell system 200 of this embodiment can be reduced in size and cost in comparison with the related art. More specifically, since the reformed gas is sent toward the combustor 1B with the reformer 12 being arranged on the flame forming side of the combustor 1B where the flames F are formed, a projected area of the fuel cell system 200 is smaller than that in the case of arranging the reformer around the combustor. Thus, the fuel cell system 200 has a simple structure not including any projection, etc. protruding in the depth direction, and reduction in size and cost of the fuel cell system 200 can be realized.

Furthermore, since the gas flow within the reformer 12 is opposed to the flow of the combustion exhaust gas, efficiency of heat exchange between both the gases is improved in comparison with the case of using any of a parallel-flow heat exchanger and a crossflow heat exchanger.

Since an outlet of the reformer 12 is heated by combustion heat of the combustor 1B, it is possible to control an outlet temperature of the reformer 12 to be high and an inlet temperature thereof to be low, and to increase reforming efficiency of the reformer 12. In other words, the flames F are formed above the combustor 1B on the side closer to the reformer 12, and the reformer 12 is heated at the bottom surface side by the combustion heat of the combustor 1B. Accordingly, the outlet of the reformer 12 can be easily controlled to a maximum temperature (e.g., about 600° C. to 700° C.). A conversion rate of the reforming reaction in the reformer 12 depends on temperature, and controlling the outlet temperature of the reformer 12 to the maximum temperature is advantageous in effectively promoting the reforming reaction that is an endothermal reaction, and in increasing the reforming efficiency of the reformer 12.

Figure 6:
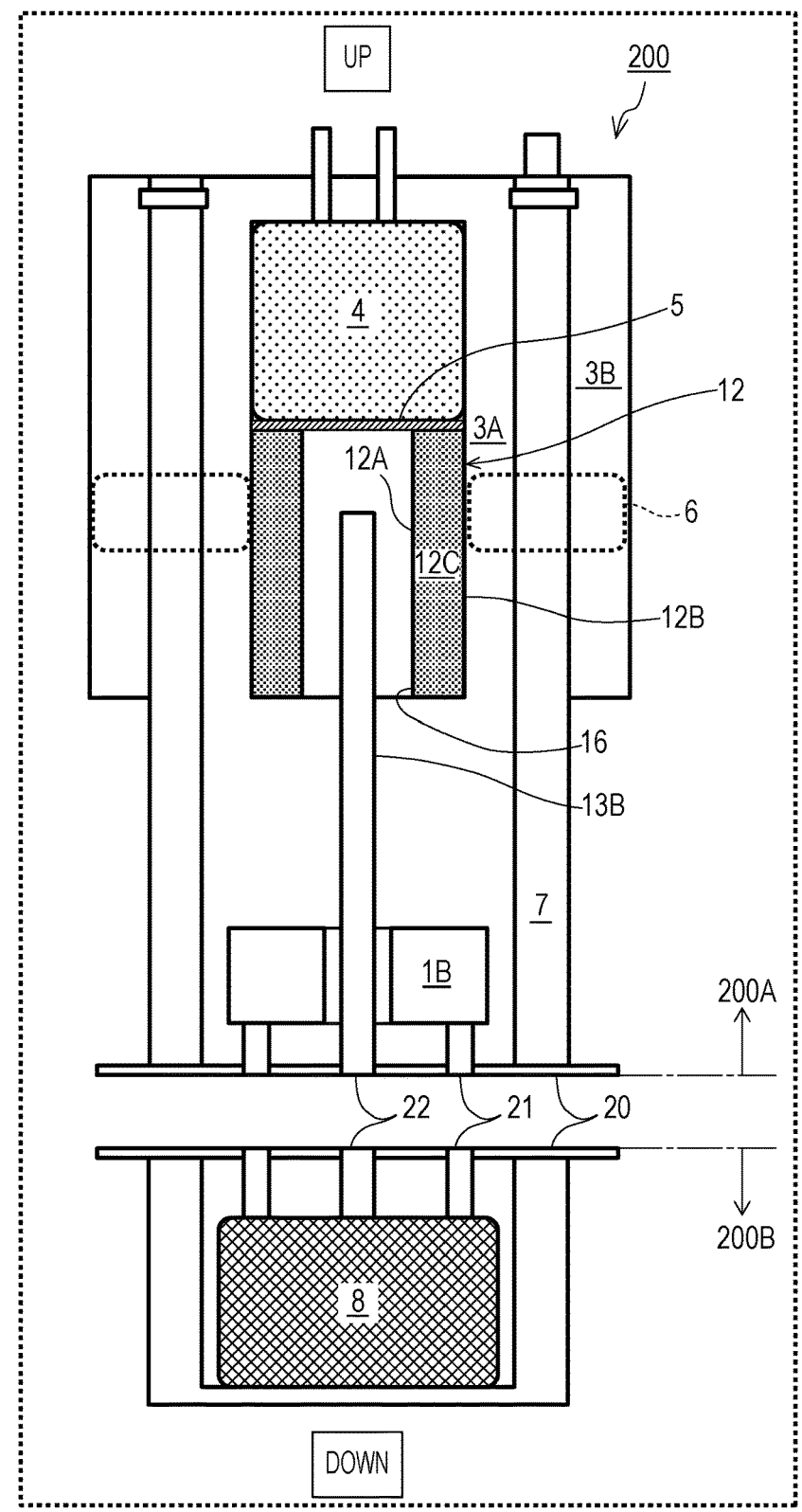
FIG. 6 is an explanatory view referenced to explain a separated configuration of the fuel cell system according to the second embodiment.

Furthermore, in the fuel cell system 200 of this embodiment, the fuel cell 8 is disposed at a position spaced from both the reformer 12 and the combustor 1B in the up-down direction. In other words, in an assembly step of the fuel cell system 200, as illustrated in FIG. 6, the container 200B containing the fuel cell 8 is separate from a container 200A containing the reformer 12 and the combustor 1B.

The container 200A and the container 200B can be finally assembled together by interconnecting separate parts of the air supply path 7 through connectors 20, separate parts of the reformed gas path 13B through connectors 22, and separate parts of the anode off-gas path through connectors 21 by, e.g., welding. Thus, the fuel cell system 200 can be assembled by adjusting only the connectors 20, 21 and 22 without depending on the shape, the size, etc. of the fuel cell 8.

While the fuel cell system 200 of this embodiment has been described in connection with an example including the hydrogen generating apparatus 100 according to the second modification of the first embodiment and the fuel cell 8, the fuel cell system 200 is not limited such an example. The fuel cell system 200 may include the hydrogen generating apparatus 100 according to any of the first embodiment, the above-described example of the first embodiment, and the first modification of the first embodiment, and the fuel cell 8.

(Third Embodiment)

As a result of intensively studying effective utilization of heat generated in a combustor with consideration paid to heat dissipation from a high-temperature reformer that constitutes a fuel cell system, a heat transfer area of the reformer, and so on, the inventors have found the following points.

In the case of integrally constituting the SOFC stack, the reformer, and the air heat exchanger as in the fuel cell systems disclosed in Japanese Unexamined Patent Application Publications No. 2013-182696 and No. 2013-191313, a diameter of the reformer is increased in comparison with, for example, the case of constituting the SOFC stack and the reformer in a separate state. In the former case, there is a possibility that an amount of heat dissipated from the reformer increases to such an extent as causing a drop of system efficiency. Moreover, when an amount of reforming catalyst in the reformer is constant, a size of the reformer in the vertical direction orthogonal to the radial direction thereof reduces as the diameter of the reformer increases. It is hence difficult to obtain a sufficient heat transfer area through which the heat generated in the combustor is transferred. Thus, it is deemed that the fuel cell systems disclosed in Japanese Unexamined Patent Application Publications No. 2013-182696 and No. 2013-191313 still have room for improvement with regard to the configuration for suppressing the heat dissipation from the reformer and effectively utilizing the heat generated in the combustor, as well as for distributing heat to the reformer and the air heat exchanger.

In addition, as a result of intensively studying effective utilization of the reforming catalyst with consideration paid to a uniform flow of a raw material to the reformer, the inventors have found the following points.

In the case of integrally constituting the SOFC stack, the reformer, and the air heat exchanger as in the fuel cell systems disclosed in Japanese Unexamined Patent Application Publications No. 2013-182696 and No. 2013-191313, a diameter of the reformer is increased in comparison with, for example, the case of constituting the SOFC stack and the reformer in a separate state. In the former case, there is a possibility that a difficulty arises in uniformly supplying the raw material in the circumferential direction of the reformer, and that effective utilization of the reforming catalyst in the reformer is impeded. Thus, it is deemed that the fuel cell systems disclosed in Japanese Unexamined Patent Application Publications No. 2013-182696 and No. 2013-191313 still have room for improvement with regard to the configuration for effectively utilizing the reforming catalyst in the reformer.

Under the situations described above, the inventors have conceived the following one aspect of the present disclosure.

A fuel cell system according to one aspect of the present disclosure comprises a reformer that includes a circular cylindrical inner wall, a circular cylindrical outer wall, and a reforming catalyst disposed between the circular cylindrical inner wall and the circular cylindrical outer wall, the reformer reforming a raw material and generating hydrogen-containing gas;

an air heat exchanger that includes a cylindrical inner wall, a cylindrical outer wall, and an air supply path defined between the cylindrical inner wall and the cylindrical outer wall, the air heat exchanger being arranged coaxially with the reformer;

a solid oxide fuel cell that generates electric power by employing the hydrogen-containing gas having been generated in the reformer and air having passed through the air heat exchanger; and a combustor that burns anode off-gas discharged from the solid oxide fuel cell, wherein the solid oxide fuel cell is disposed at a position spaced from both the reformer and the combustor along a center axis of the reformer, the reformer is disposed at a position spaced from the combustor, the circular cylindrical inner wall is arranged around a combustion space for a flame that is formed by the combustor, and an exhaust gas path of the combustor is formed by a first space between a lower end of the reformer and the combustor and by a second space between the circular cylindrical outer wall and the cylindrical inner wall.

With the features described above, the fuel cell system according to the one aspect is able to more reliably suppress the heat dissipation from the reformer, and to more effectively utilize heat generated in the combustor than the related art. More specifically, since the solid oxide fuel cell is spaced from the reformer and the air heat exchanger, thermal design of the reformer and the air heat exchanger can be performed without depending on the shape of the solid oxide fuel cell. For example, an external shape of the reformer can be set to predetermined sizes, without depending on the shape of the solid oxide fuel cell, to be capable of appropriately suppressing the heat dissipation from the reformer and obtaining an appropriate heat transfer area through which the heat generated in the combustor is transferred. Furthermore, since the air heat exchanger exhibiting a lower temperature than the reformer is disposed on the outer side of the reformer, the heat dissipated from the reformer can be effectively utilized (namely, heat dissipation from the fuel cell system to the outside can be appropriately suppressed).

Moreover, in the fuel cell system according to the one aspect, the reforming catalyst in the reformer can be more effectively utilized than the related art. More specifically, since the solid oxide fuel cell and the reformer are spaced from each other, fluid design of the raw material supplied to the reformer can be performed without depending on the shape of the solid oxide fuel cell. For example, the external shape of the reformer can be set to predetermined sizes, without depending on the shape of the solid oxide fuel cell, such that the raw material can be uniformly supplied in the circumferential direction of the reformer.

Practical examples of this embodiment will be described below with reference to the accompanying drawings.

[Apparatus Configuration]

Figure 7:
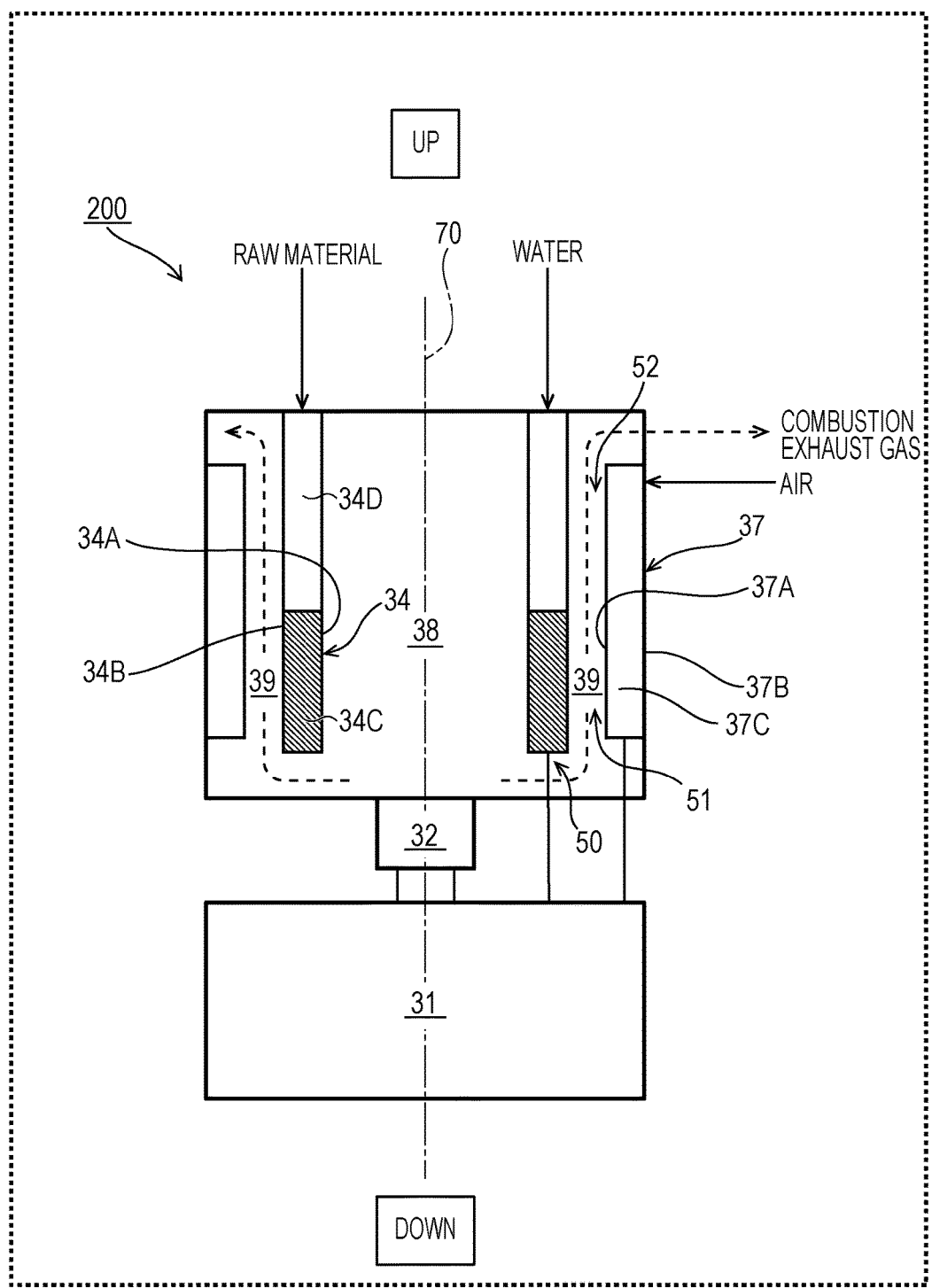
FIG. 7 illustrates an exemplary fuel cell system according to a third embodiment.

FIG. 7 illustrates an exemplary fuel cell system according to a third embodiment.

As illustrated in FIG. 7, a fuel cell system 200 includes a solid oxide fuel cell (SOFC) 31, a combustor 32, a reformer 34, and an air heat exchanger 37. For convenience of explanation, it is assumed that, in FIG. 7 (as well as in other Figures), "up" and "down" in the fuel cell system 200 are defined as denoted in the drawings, and gravity acts from the "up" side toward the "down" side.

The reformer 34 includes a circular cylindrical inner wall 34A, a circular cylindrical outer wall 34B, and a reforming catalyst 34C disposed between the circular cylindrical inner wall 34A and the circular cylindrical outer wall 34B. The reformer 34 reforms the raw material and generates reformed gas containing hydrogen. In other words, a container of the reformer 34 has a double-wall cylindrical shape made up of the circular cylindrical inner wall 34A and the circular cylindrical outer wall 34B. With such a configuration, durability against thermal stress can be appropriately obtained for the container of the reformer 34 that exhibits a high temperature.

A reforming reaction in the reformer 34 may be of any suitable type. The reforming reaction may be, e.g., a steam reforming reaction or an autothermal reaction. In general, at least one selected from among a group consisting of noble metal catalysts, such as Pt, Ru and Rh, and Ni can be used as the reforming catalyst 34. In the fuel cell system 200 of this embodiment, the steam reforming reaction is utilized as the reforming reaction in the reformer 34, and a catalyst containing Ru is used as the reforming catalyst 34C in the reformer 34.

The reformer 34 includes, above the reforming catalyst 34C, a water evaporator 34D that is formed by the circular cylindrical inner wall 34A and the circular cylindrical outer wall 34B. In other words, the reforming catalyst 34C is filled within the container of the reformer 34 in its lower portion, and the water evaporator 34D is formed in an upper portion of the container. With such a configuration, the water evaporator 34D for generating steam supplied to the reforming catalyst 34C can be more simply constituted than in the case where the reformer 34 does not include the water evaporator. The raw material and water both having passed through the water evaporator 34D are supplied to the reforming catalyst 34C. The water evaporator 34D may include a water receiver (not illustrated) that temporarily stores the water flowing in the water evaporator 34D along the way, or a flow path member that forms a spiral flow path. Even when the water inside the water evaporator 34D is caused, by employing the water receiver or the flow path member, to fall in the direction in which gravity acts, the water flowing in the water evaporator 34D can be appropriately evaporated along the way. The flow path member forming the spiral flow path will be described in detail later in Example.

Though not illustrated in FIG. 7, devices to be used in developing the reforming reaction are disposed as appropriate. For example, when the reforming reaction is the steam reforming reaction, a water supplier for supplying water to the evaporator, etc. are disposed. When the reforming reaction is the autothermal reaction, an air supplier for supplying air to the reformer 34 is further disposed in the fuel cell system 200. The raw material is hydrocarbon fuel containing organic compounds made up of at least carbons and hydrogens, such as city gas, natural gas, and LPG in each of which methane is a main constituent.

The air heat exchanger 37 includes a cylindrical inner wall 37A, a cylindrical outer wall 37B, and an air supply path 37C defined between the cylindrical inner wall 37A and the cylindrical outer wall 37B, and it is arranged coaxially with the reformer 34 in a surrounding relation to the reformer 34. In other words, a container of the air heat exchanger 37 has a double-wall cylindrical shape made up of the cylindrical inner wall 37A and the cylindrical outer wall 37B. An inner space of the container serves as a path for air, i.e., a heat receiving fluid, in the air heat exchanger 37.

The cylindrical inner wall 37A and the cylindrical outer wall 37B may have a circular cylindrical shape or a rectangular cylindrical shape. When the cylindrical inner wall 37A and the cylindrical outer wall 37B have the circular cylindrical shape, an advantage is obtained in providing higher durability against thermal stress than the case where they have the rectangular cylindrical shape. When the cylindrical inner wall 37A and the cylindrical outer wall 37B have the rectangular cylindrical shape, an advantage is obtained in that it is easier to cover the air heat exchanger 37 with a heat insulating material than the case where they have the circular cylindrical shape. A path for combustion exhaust gas, i.e., a heating fluid, in the air heat exchanger 37 will be described later.

The solid oxide fuel cell 31 generates electric power by employing hydrogen-containing gas having been generated in the reformer 34 and air having passed through the air heat exchanger 37. The solid oxide fuel cell 31 is, for example, a flat-plate stack constituted by stacking individual members such as flat-plate cells and interconnectors, but the solid oxide fuel cell 31 is not limited to that type.

Connected to the solid oxide fuel cell 31 are a supply path through which the hydrogen-containing gas (reformed gas) is supplied from the reformer 34, the air supply path through which air is supplied from the air heat exchanger 37, a discharge path for the reformed gas (anode off-gas) that has not been utilized in generating electric power, a discharge path for the air (cathode off-gas) that has not been utilized in generating electric power, etc. The fuel cell system 200 further includes at appropriate locations a heat exchanger for recovering heat of the cathode off-gas, a stack temperature detector for detecting an operating temperature of the stack, an electrode from which electric power is taken out, and so on. However, because those components are similar to those used in a general fuel cell system, detailed description thereof is omitted.

The combustor 32 burns the anode off-gas having been discharged from the solid oxide fuel cell 31. More specifically, the anode off-gas and the cathode off-gas both discharged from the solid oxide fuel cell 31 are sent to the combustor 32 through the anode off-gas discharge path and the cathode off-gas discharge path, respectively. Those gases are burnt in the combustor 32. As a result, combustion exhaust gas at a high temperature is generated in a combustion space 38. Thus, in the fuel cell system 200 of this embodiment, the combustor 32 is disposed outside the solid oxide fuel cell 31, and the anode off-gas discharge path and the cathode off-gas discharge path both extending from the solid oxide fuel cell 31 are connected to the combustor 32 at appropriate locations.

While an ignitor, a combustion sensor, etc. are disposed in the combustor 32, those components are similar to those used in a combustor of a general fuel cell system. Hence detailed description and drawings of those components are omitted.

Here, as illustrated in FIG. 7, the solid oxide fuel cell 31 is disposed at a position spaced from both the reformer 34 and the combustor 32 along a center axis 70 of the reformer 34. The reformer 34 is disposed at a position spaced from the combustor 32 along the center axis 70 of the reformer 34. The circular cylindrical inner wall 34A of the reformer 34 is arranged around the combustion space 38 for a flame that is formed by the combustor 32. In other words, the reformer 34 (combustion space 38), the combustor 32, and the solid oxide fuel cell 31 are successively arranged at appropriate distances of spacing therebetween in the mentioned order in the direction downward from above, i.e., in the gravity-acting direction.

Furthermore, an exhaust gas path 39 of the combustor 32 is formed by a first space 50 between a lower end of the reformer 34 and the combustor 32, and by a second space 51 between the circular cylindrical outer wall 34B of the reformer 34 and the cylindrical inner wall 37A of the air heat exchanger 37. Thus, the combustion exhaust gas is guided to flow upward in the second space 51 after passing through the first space 50 just under the lower end of the reformer 34.

Though not illustrated, a temperature detector may be disposed to detect a temperature of the reformed gas near a gas outlet of the reformer 34. With the provision of such a temperature detector, a controller (not illustrated) can execute feedback control such that the temperature of the reformer 34 is kept at an appropriate value on the basis of the detected temperature of the reformer 34.

With the configuration described above, the fuel cell system 200 of this embodiment is able to more reliably suppress the heat dissipation from the reformer 34, and to more effectively utilize the heat generated in the combustor 32 than the related art. More specifically, since the solid oxide fuel cell 31 is spaced from both the reformer 34 and the air heat exchanger 37, thermal design of the reformer 34 and the air heat exchanger 37 can be performed without depending on the shape of the solid oxide fuel cell 31. For example, an external shape of the reformer 34 can be set to predetermined sizes, without depending on the shape of the solid oxide fuel cell 31, to be capable of appropriately suppressing the heat dissipation from the reformer 34 and obtaining an appropriate heat transfer area through which the heat generated in the combustor 12 is transferred. Furthermore, since the air heat exchanger 37 exhibiting a lower temperature than the reformer 34 is disposed on the outer side of the reformer 34, the heat dissipated from the reformer 34 can be effectively utilized (namely, heat dissipation from the fuel cell system 200 to the outside can be appropriately suppressed).

Moreover, in the fuel cell system 200 of this embodiment, the reforming catalyst 34C in the reformer 34 can be more effectively utilized than the related art. More specifically, since the solid oxide fuel cell 31 and the reformer 34 are spaced from each other, fluid design of the raw material supplied to the reformer 34 can be performed without depending on the shape of the solid oxide fuel cell 31. For example, the external shape of the reformer 34 can be set to predetermined sizes, without depending on the shape of the solid oxide fuel cell 31, such that the raw material can be uniformly supplied in the circumferential direction of the reformer 34.

[Operation]

One example of operation of the fuel cell system 200 of this embodiment will be described below with reference to FIG. 7.

Because the steam reforming reaction is developed in the fuel cell system 200 of this embodiment, water for reforming is supplied to the water evaporator 34D through a water supply path that is in communication with a water supplier (not illustrated). Steam is generated in the water evaporator 34D, and the generated steam is mixed, in the water evaporator 34D, with the raw material supplied through a raw-material supply path that is in communication with a raw material supplier (not illustrated). At that time, the raw material is heated in the water evaporator 34D. A resultant gas mixture is sent to a space in which the reforming catalyst 34C is disposed. In the reforming catalyst 34C, the steam reforming reaction of the raw material is progressed, and hydrogen-containing gas (reformed gas) is generated. The reformed gas is supplied to the solid oxide fuel cell 31 through a reformed gas supply path.

On the other hand, air supplied through the air supply path in communication with an air supplier (not illustrated) is sent to the air heat exchanger 37. In the air heat exchanger 37, the air is heated through heat exchange with the combustion exhaust gas flowing in the exhaust gas path 39. The air is then supplied to the solid oxide fuel cell 31 through the air supply path.

In the solid oxide fuel cell 31, electric power is generated by employing, as fuels, the reformed gas and air. The reformed gas (anode off-gas) that has not been utilized in generating electric power and the air (cathode off-gas) that has not been utilized in generating electric power are sent to the combustor 32 through a anode off-gas supply path and a cathode off-gas supply path, respectively.

In the combustor 32, the anode off-gas and the cathode off-gas are burnt, and a flame directed toward the combustion space 38 is formed. As a result, the reforming catalyst 34C in the reformer 34 can be appropriately heated by heat of the flame through the circular cylindrical inner wall 34A.

On that occasion, the combustion exhaust gas generated with the combustion in the combustor 32 flows through the first space 50 between the lower end of the reformer 34 and the combustor 32 as denoted by dotted lines in FIG. 7. Thus, since the reformer 34 on the downstream side in the flowing direction of the reformed gas is heated by the combustion exhaust gas at the high temperature, a temperature near a gas outlet for the reforming catalyst 34C can be kept high. Accordingly, the reforming reaction being an endothermal reaction is effectively progressed, and the reformed gas containing a larger amount of hydrogen can be generated.

After passing through the first space 50, the combustion exhaust gas flows through the second space 51 between the circular cylindrical outer wall 34B of the reformer 34 and the cylindrical inner wall 37A of the air heat exchanger 37. Accordingly, the reforming catalyst 34C in the reformer 34 can be appropriately heated by heat of the combustion exhaust gas through the circular cylindrical outer wall 34B. The air in a downstream portion of the air heat exchanger 37 can also be appropriately heated (preheated) by the heat of the combustion exhaust gas through the cylindrical inner wall 37A.

On that occasion, since a flow of each of the air in the air heat exchanger 37 and the gas mixture in the reformer 34 is opposed to a flow of the combustion exhaust gas in the second space 51, performance of heat exchange is higher than that in the case where the flows of those fluids are parallel or orthogonal to each other. Hence the air and the gas mixture can be efficiently heated. In addition, since the combustion exhaust gas at the high temperature immediately after passing through the reformer 34 performs heat exchange with the air on the side near the gas outlet of the air heat exchanger 37, the air heated up to a sufficiently high temperature can be supplied to the solid oxide fuel cell 31.

After passing through the second space 51, the combustion exhaust gas flows around the water evaporator 34D. Here, a space 52 around the water evaporator 34D corresponds to a gap between a portion of the circular cylindrical outer wall 34B, the portion constituting the water evaporator 34D, and a portion of the cylindrical inner wall 37A, the portion constituting an upstream portion of the air heat exchanger 37. With such a configuration, the water evaporator 34D can be appropriately heated by the heat of the combustion exhaust gas. Moreover, the air in the upstream portion of the air heat exchanger 37 can be appropriately heated (preheated) by the heat of the combustion exhaust gas through the cylindrical inner wall 37A. In particular, temperatures near inlets of the water evaporator 34D and the air heat exchanger 37 are relatively low. Thus, since heat exchange is carried out between the gases flowing through those inlets and the combustion exhaust gas having passed through the second space 51, the heat of the combustion exhaust gas can be effectively utilized. More specifically, respective suitable temperatures near the gas outlet of the reformer 34 exposed to the first space 50, near the gas outlet of the air heat exchanger 37 exposed to the second space 51, and in the water evaporator 34D are at levels lowering in the mentioned order. By causing the combustion exhaust gas to flow as described above, therefore, the heat of the combustion exhaust gas is utilized in a cascaded manner. As a result, the fuel cell system 200 capable of providing power generation energy at relatively high efficiency with respect to input energy of the raw material can be realized.

The combustion exhaust gas having passed through the space 52 around the water evaporator 34D is discharged to the outside of the fuel cell system 200 through a combustion exhaust gas discharge path.

Example

Figure 8:
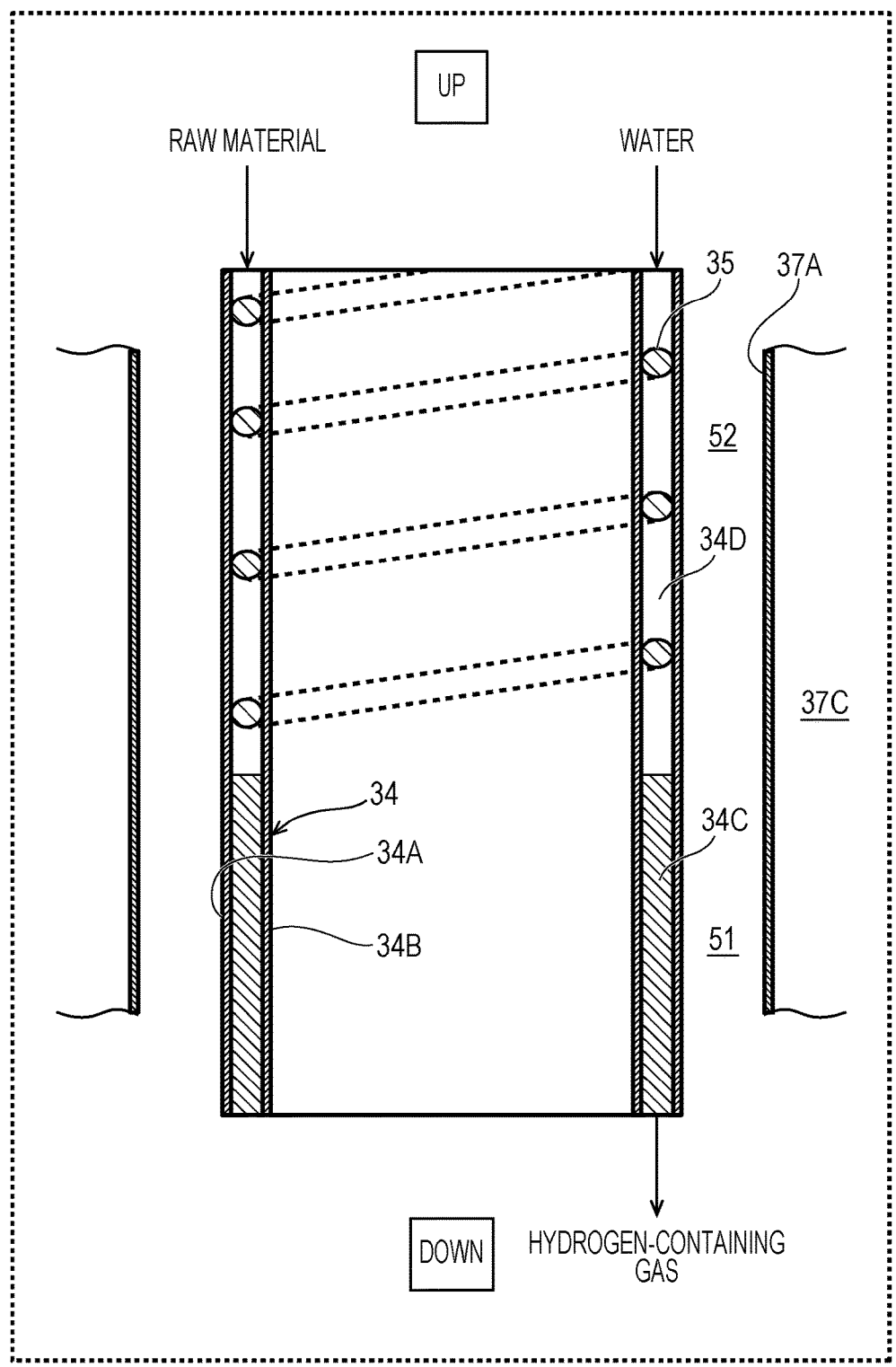
FIG. 8 illustrates an exemplary fuel cell system according to an example of the third embodiment.

FIG. 8 illustrates an exemplary fuel cell system according to an example of the third embodiment. FIG. 8 illustrates a practical example of the water evaporator 34D.

As illustrated in FIG. 8, in the fuel cell system 200 of this example, the water evaporator 34D includes a flow path member 35 that is disposed between the circular cylindrical inner wall 34A and the circular cylindrical outer wall 34B, and that forms a spiral flow path. The raw material and the water spirally flow along the flow path member 35. The flow path member 35 may be formed of, e.g., a flexible member. The flexible member may be, e.g., a metal wire.

With the configuration described above, the flow path member 35 can appropriately form a spiral flow of the raw material and the water in the circumferential direction of the water evaporator 34D from the upstream side where temperatures of the raw material and the water are relatively low toward the downstream side where those temperature are increased by heating with the combustion exhaust gas. Hence the heat of the combustion exhaust gas can be effectively utilized.

The fuel cell system 200 of this example may be constituted in a similar manner to that in the fuel cell system 200 of the third embodiment except for the above-described feature.

(Fourth Embodiment)

Figure 9:
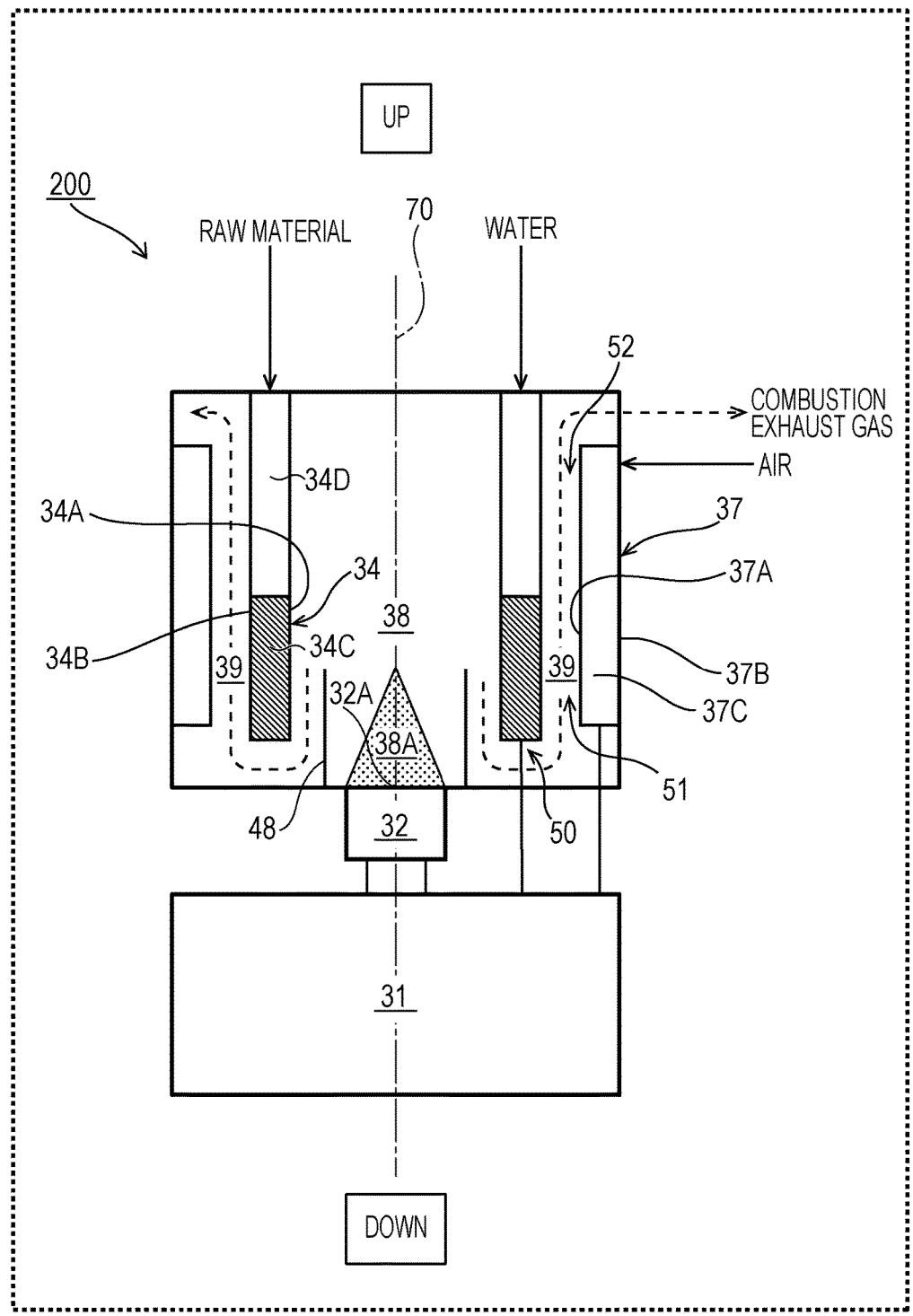
FIG. 9 illustrates an exemplary fuel cell system according to a fourth embodiment.

FIG. 9 illustrates an exemplary fuel cell system according to a fourth embodiment.

As illustrated in FIG. 9, the fuel cell system 200 of this embodiment is constituted such that, in the fuel cell system 200 according to the third embodiment or the example of the third embodiment, the system further includes a circular cylindrical flame guide 48 abutted against a surface of the combustor 32 where a flame opening 32A is formed, and that the flame guide 48 is arranged on the inner side of the circular cylindrical inner wall 34A coaxially with the reformer 34 in a surrounding relation to the combustion space 38 above the flame opening 32A. In this embodiment, the flame guide 48 is abutted against a lower wall portion of a container containing the reformer 34, the air heat exchanger 37, etc. (e.g., a lower wall portion of that container where the flame opening 32A of the combustor 32 is formed), and it is erected to vertically extend upward around the combustion space 38. In consideration of combustibility of the combustor 32, an upper end of the flame guide 48 is desirably set such that the flame guide 48 has a larger length than the flame 38A formed by the combustor 32 under operating conditions which are assumed in the fuel cell system 200. Furthermore, the upper end of the flame guide 48 is desirably set to be positioned lower than an upper end of a region where the reforming catalyst 34C is filled.

Because of the flame guide 48 being disposed coaxially with the reformer 34, the flame 38A is appropriately formed to extend upward from the flame opening 32A of the combustor 32 along the flame guide 48 in the combustion space 38 on the upper side. The combustion exhaust gas from the combustor 32 is guided upward along the flame guide 48. After turning around at the upper end of the flame guide 48, the combustion exhaust gas is guided to the first space 50.

As a result, the combustion in the combustor 32 is stabilized in comparison with the case where the flame guide 48 is not disposed.

For example, when fluctuations in gas pressure (e.g., pressure fluctuations due to changes in condensation rate of a not-illustrated water condensation tank) occur in the combustion exhaust gas discharge path outside the fuel cell system 200, the combustion in the combustor 32 becomes unstable unless the flame guide 48 is not disposed. This may lead to a possibility that heated conditions of the reformer 34 are changed, thus making unstable the reforming reaction in the reformer 34. For example, there is a possibility that the flame 38A directly contacts the reformer 34 and the temperature of the reforming catalyst 34C is partly increased in some cases. With the temperature of the reforming catalyst 34C being partly increased, durability of the reforming catalyst 34C may degrade.

In the fuel cell system 200 of this embodiment, the possibility of the occurrence of the above-described problem is reduced because, with the provision of the flame guide 48, the formation of the flame 38A is stabilized and the flame 38A is prevented from directly contacting the reformer 34.

The fuel cell system 200 of this embodiment is similar to the fuel cell system 200 according to any of the third embodiment and the example of the third embodiment except for the above-described feature, and hence description of the entire fuel cell system is omitted.

(Fifth Embodiment)

Figure 10:
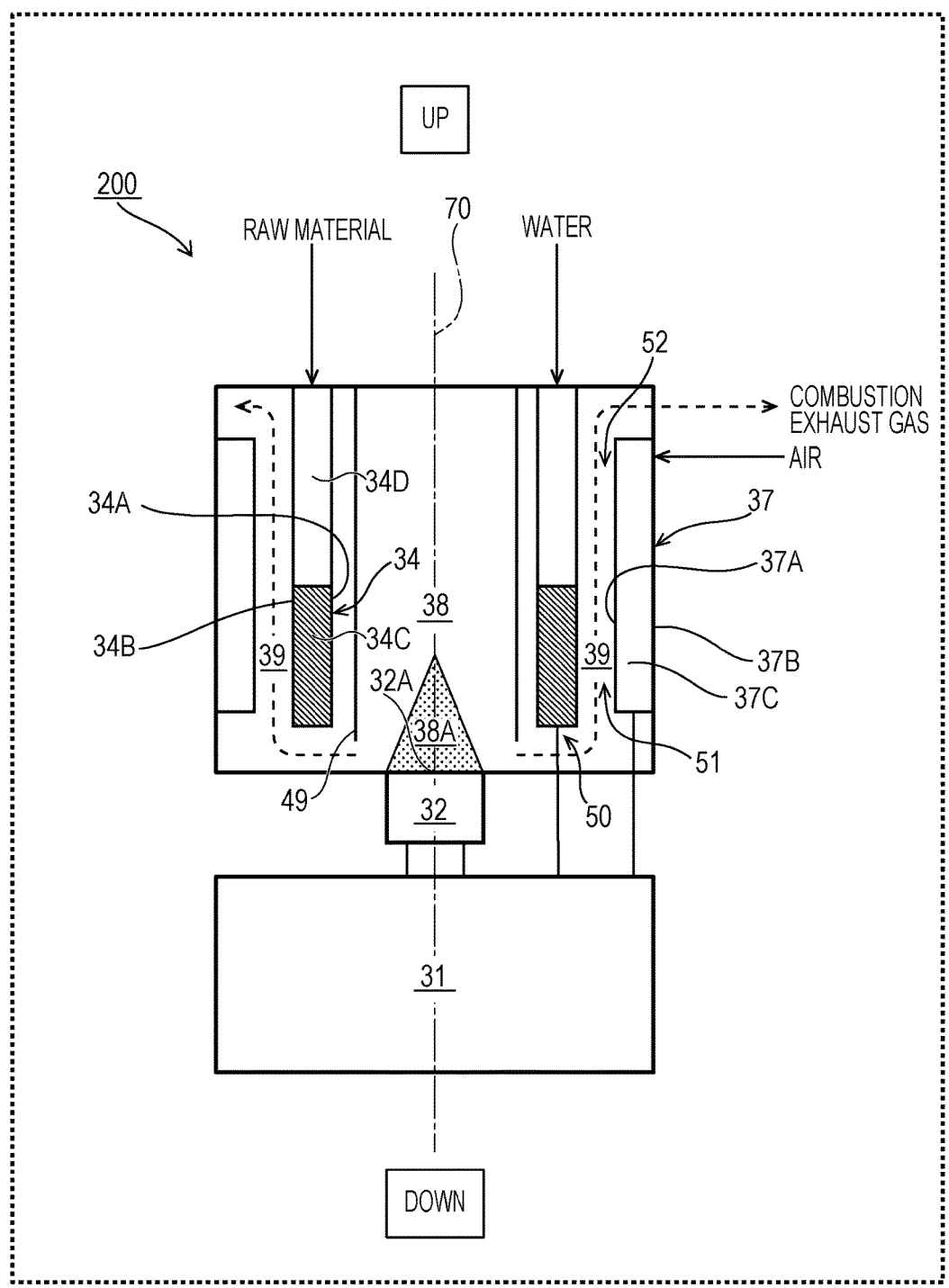
FIG. 10 illustrates an exemplary fuel cell system according to a fifth embodiment.

FIG. 10 illustrates an exemplary fuel cell system according to a fifth embodiment.

As illustrated in FIG. 10, the fuel cell system 200 of this embodiment is constituted such that, in the fuel cell system 200 according to any of the third embodiment, the example of the third embodiment, and the fourth embodiment, the system further includes a combustion exhaust gas guide 49 having a circular cylindrical shape and extending upward along the center axis 70 of the reformer 34 from a position spaced from the combustor 32, and that the combustion exhaust gas guide 49 is arranged on the inner side of the circular cylindrical inner wall 34A coaxially with the reformer 34. In this embodiment, the combustion exhaust gas guide 49 is abutted against an upper wall portion of the container containing the reformer 34, the air heat exchanger 37, etc. (e.g., an upper wall portion of that container in an opposite relation to the lower wall portion thereof where the flame opening 32A is formed), and it extends, from the upper wall portion, vertically downward around the combustion space 38. A lower end of the combustion exhaust gas guide 49 is desirably set to a position at which the combustion exhaust gas guide 49 does not impede the flow of the combustion exhaust gas through the first space 50, and which is lower than the upper end of the region where the reforming catalyst 34C is filled. Furthermore, the spacing between the combustion exhaust gas guide 49 and the circular cylindrical inner wall 34A of the reformer 34 is desirably set to such a size that they do not contact with each other and the formation of the flame 38A in the combustion space 38 is not impeded.

The reformer 34 can be stably heated by providing the combustion exhaust gas guide 49 coaxially with the reformer 34 as described above.

More specifically, when fluctuations in gas pressure occur in the combustion exhaust gas discharge path outside the fuel cell system 200, those fluctuations may cause a possibility that heated conditions of the reformer 34 are changed, thus making unstable the reforming reaction in the reformer 34. For example, there is a possibility that the flame 38A directly contacts the reformer 34 and the temperature of the reforming catalyst 34C is partly increased in some cases. With the temperature of the reforming catalyst 34C being partly increased, durability of the reforming catalyst 34C may degrade.

In the fuel cell system 200 of this embodiment, with the provision of the combustion exhaust gas guide 49, the flame 38A can be prevented from directly contacting the reformer 34, and the reforming reaction in the reformer 34 can be stabilized.

The combustion exhaust gas guide 49 is heated by the flame 38A and the combustion exhaust gas, and hence it exhibits a high temperature. Since the combustion exhaust gas guide 49 is arranged in an oppositely facing relation to the circular cylindrical inner wall 34A of the reformer 34, the combustion exhaust gas guide 49 functions as a heat radiant surface of the reformer 34 and heats the circular cylindrical inner wall 34A of the reformer 34. In comparison with the case of directly heating the circular cylindrical inner wall 34A of the reformer 34 by the flame 38A and the combustion exhaust gas, a temperature distribution occurs with the provision of the combustion exhaust gas guide 49 due to thermal conduction in a material constituting the combustion exhaust gas guide 49, but partial heating of the reformer 34 can be suppressed because the reformer 34 can be heated through heat radiation with the aid of a surface of the combustion exhaust gas guide 49. Moreover, the circular cylindrical outer wall 34B of the reformer 34 is heated by the combustion exhaust gas flowing through the second space 51 in addition to the heating through the circular cylindrical inner wall 34A. Therefore, the reforming catalyst 34C can be effectively heated through both the circular cylindrical inner wall 34A and the circular cylindrical outer wall 34B, and the reforming reaction in the reformer 34 can be effectively progressed.

The fuel cell system 200 of this embodiment is similar to the fuel cell system 200 according to any of the third embodiment, the example of the third embodiment, and the fourth embodiment except for the above-described feature, and hence description of the entire fuel cell system is omitted.

(Sixth Embodiment)

Figure 11:
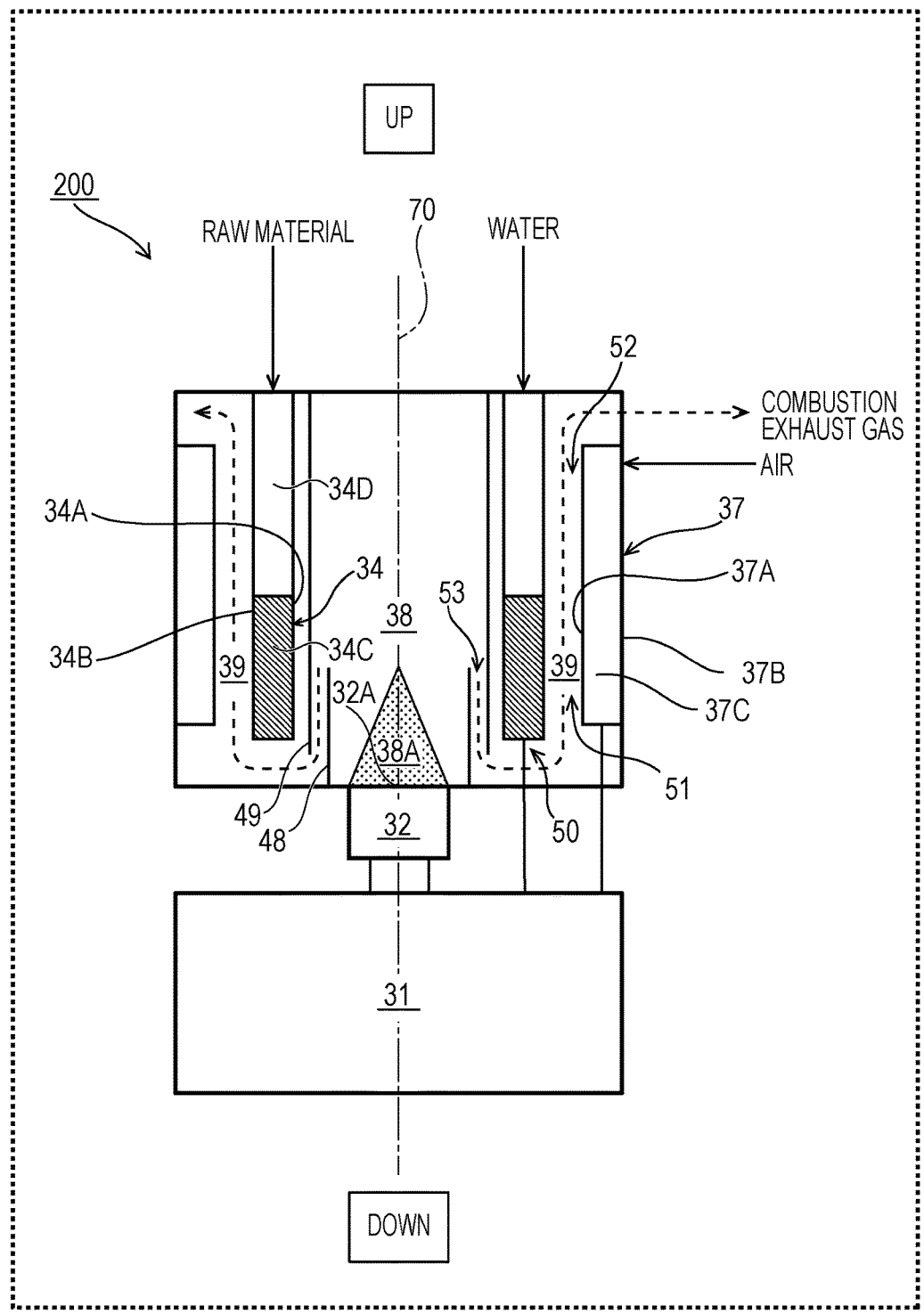
FIG. 11 illustrates an exemplary fuel cell system according to a sixth embodiment.

FIG. 11 illustrates an exemplary fuel cell system according to a sixth embodiment.

As illustrated in FIG. 11, the fuel cell system 200 of this embodiment is constituted such that, in the fuel cell system 200 according to the fourth embodiment, the system further includes a combustion exhaust gas guide 49 having a circular cylindrical shape and extending upward along the center axis 70 of the reformer 34 from a position spaced from the combustor 32, and that the combustion exhaust gas guide 49 is arranged on the inner side of the circular cylindrical inner wall 34A of the reformer 34 coaxially with the reformer 34 in a state surrounding a flame guide 48 and coaxially with the flame guide 48.

The flame guide 48 and the combustion exhaust gas guide 49 in this embodiment have the same functions as those of the flame guide 48 in the fourth embodiment and the combustion exhaust gas guide 49 in the fifth embodiment. Hence description of those guides is omitted.

In the fuel cell system 200 of this embodiment, an exhaust gas path 39 of the combustor 32 is formed by a third space 53 between the flame guide 48 and the combustion exhaust gas guide 49, as well as by the first space 50 and the second space 51. Since the combustion exhaust gas is caused to flow through the third space 53, it is possible to rectify a flow of the combustion exhaust gas. Thus, the rectified combustion exhaust gas having passed through the third space 53 can be sent to the first space 50 and the second space 51.

The fuel cell system 200 of this embodiment is similar to the fuel cell system 200 according to the fourth embodiment except for the above-described feature, and hence description of the entire fuel cell system is omitted.

(Modifications)

Figure 12:
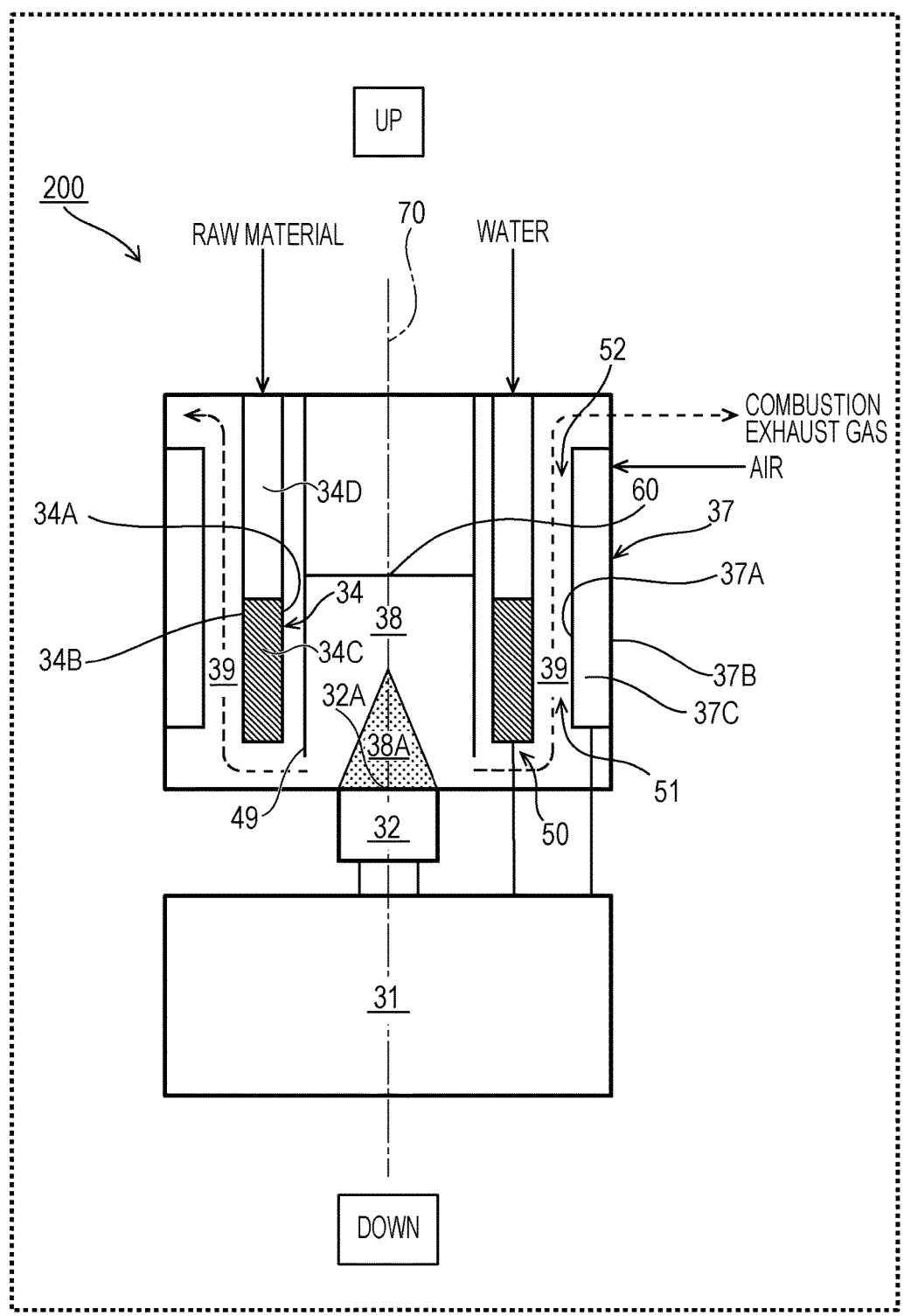
FIG. 12 illustrates an exemplary fuel cell system according to a modification of the fifth embodiment.
Figure 13:
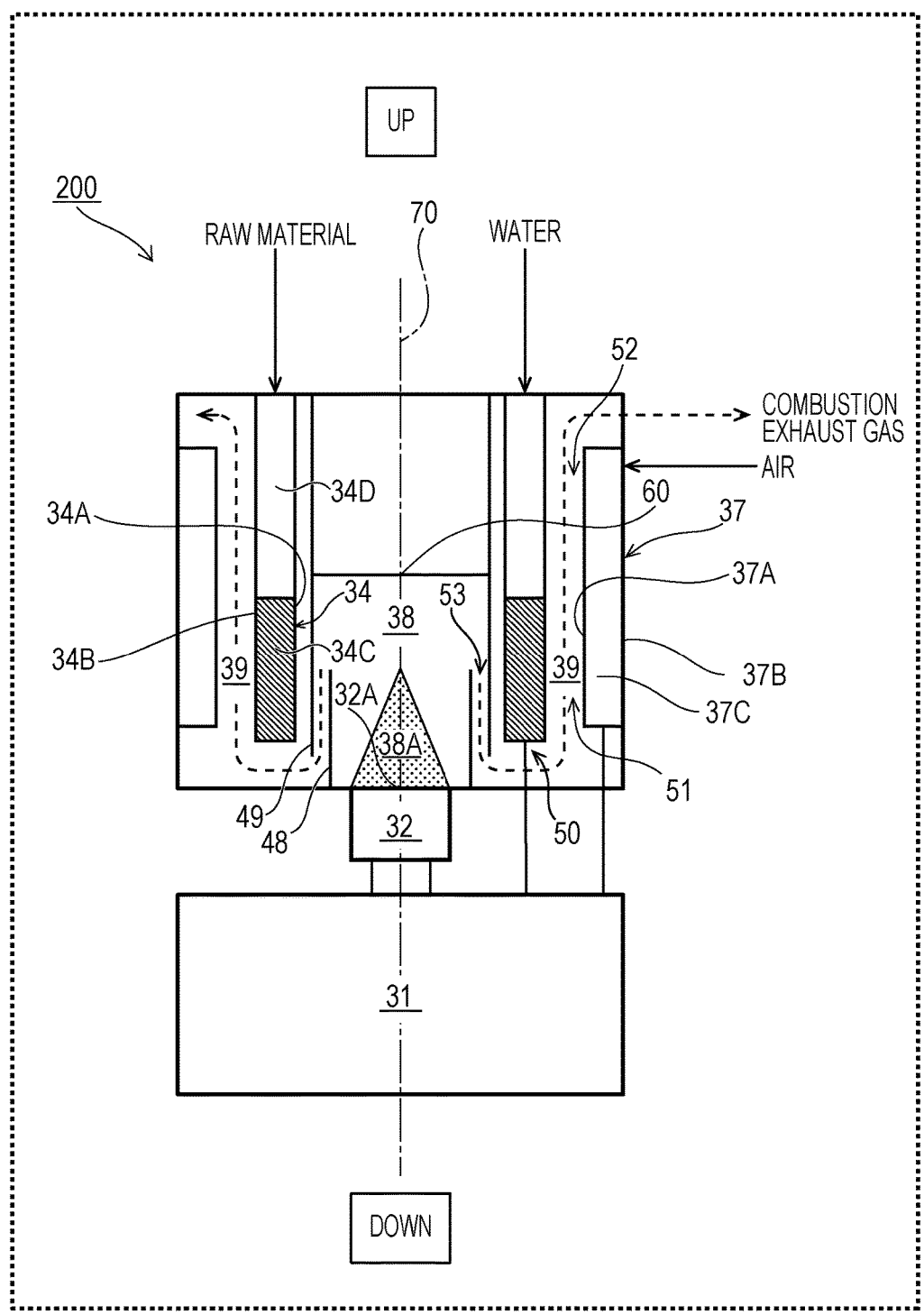
FIG. 13 illustrates an exemplary fuel cell system according to a modification of the sixth embodiment.

FIG. 12 illustrates an exemplary fuel cell system according to a modification of the fifth embodiment. FIG. 13 illustrates an exemplary fuel cell system according to a modification of the sixth embodiment.

As illustrated in FIGS. 12 and 13, the fuel cell system 200 according to each of the modifications is constituted such that, in the fuel cell system 200 according to the fifth embodiment or the sixth embodiment, the system further includes a top plate 60 covering the combustor 32 from above on the inner side of the combustion exhaust gas guide 49, and that the top plate 60 is arranged in a horizontal plane including an upper end of the region where the reforming catalyst 34C is filled, or near the horizontal plane. With the provision of the top plate 60, the reformer 34 can be effectively heated.

More specifically, from the viewpoint of effectively heating the reforming catalyst 34C, the position where the top plate 60 is arranged in the up-down direction is desirably set to such a position that the flame 38A does not touch the top plate 60, the position being in the horizontal plane including the upper end of the region where the reforming catalyst 34C is filled, or near the horizontal plane in the up-down direction. The reason is as follows.

In the fuel cell system 200 including the combustion exhaust gas guide 49, as described above, the combustion exhaust gas guide 49 is heated by the flame 38A and the combustion exhaust gas. When the top plate 60 is disposed as described above, a lower portion of the combustion exhaust gas guide 49, which is positioned lower than the arranged position of the top plate 60, is heated by the flame 38A and the combustion exhaust gas in a concentrated fashion. Accordingly, the heating of the reforming catalyst 34C in a portion of the reformer 34, the portion being positioned to oppositely face the lower portion of the combustion exhaust gas guide 49, is promoted in comparison with the case where the top plate 60 is not disposed at the above-mentioned position. As a result, the reforming reaction in the reformer 34 can be effectively promoted.

On the other hand, in an upper portion of the combustion exhaust gas guide 49 above the arranged position of the top plate 60, the heating by the combustion exhaust gas is appropriately suppressed. Accordingly, the heating applied to the water evaporator 34D, which is positioned to oppositely face the upper portion of the combustion exhaust gas guide 49, is suppressed, and the temperature of the combustion exhaust gas flowing through the first space 50 and the second space 51 becomes higher than that in the case where the top plate 60 is not disposed at the above-mentioned position. As a result, the reformer 34 can be effectively heated, and the temperature of the air sent to the solid oxide fuel cell 31 can be increased.

In the fuel cell system 200 of FIG. 13, as described above, since the flame guide 48 is disposed coaxially with the reformer 34, the flame 38A can be more stably formed to extend upward from the flame opening 32A along the flame guide 48 than in the fuel cell system 200 of FIG. 12. As a result, the combustibility of the combustor 32 can be improved.

Moreover, in the fuel cell system 200 of FIG. 13, the combustion exhaust gas generated with the combustion in the combustor 32 flows through the third space 53, the first space 50, the second space 51, and the space 52 around the water evaporator 34D successively in the mentioned order, as denoted by dotted lines in FIG. 13. Thus, after the flow of the combustion exhaust gas has been rectified through the third space 53, the heat of the combustion exhaust gas from the combustor 32 can be effectively utilized in a cascaded manner.

The fuel cell systems 200 of the above modifications are each similar to the fuel cell system 200 according to the fifth embodiment or the sixth embodiment except for the above-described feature, and hence description of the entire fuel cell system is omitted.

The first embodiment, the second embodiment, the third embodiment, the example of the third embodiment, the fourth embodiment, the fifth embodiment, the sixth embodiment, the modification of the fifth embodiment, and the modification of the sixth embodiment may be combined in a suitable manner insofar as no interferences occur in the resulted combinations.

Various improvements and other embodiments are apparent to those skilled in the art from the above description. Thus, the above description is presented with intent to teach the best mode for carrying out the present disclosure to those skilled in the art, and it is to be construed illustratively. Details of the above-described structures and/or functions can be substantially modified without departing from the sprint of the present disclosure.

The one aspect of the present disclosure can realize reduction in size and cost in comparison with the related art, and can be utilized in a hydrogen generating apparatus, a fuel cell system, and so on.

What is claimed is:

1. A hydrogen generating apparatus comprising:
a reformer that reforms fuel and generates reformed gas containing hydrogen;
a combustor that heats the reformer, the reformer being arranged on a flame forming side of the combustor;
an exhaust gas path which covers surroundings of an outer wall of the reformer and through which combustion exhaust gas from the combustor flows; and
a reformed gas path through which the reformed gas sent from the reformer toward the combustor flows,
wherein the exhaust gas path is configured such that the combustion exhaust gas flows upward from the combustor and the reformed gas path extends downward towards the combustor and passes through the combustor, and a gas flow within the reformer in a portion thereof where the gas flow contacts the outer wall of the reformer is opposed to a flow of the combustion exhaust gas in the exhaust gas path in a portion thereof where the combustion exhaust gas contacts the outer wall of the reformer.

2. The hydrogen generating apparatus according to claim 1, wherein the reformer includes a sidewall portion that is formed by the outer wall and an inner wall.

3. The hydrogen generating apparatus according to claim 2, wherein the inner wall and the outer wall are each a circular cylindrical body.

4. The hydrogen generating apparatus according to claim 2, wherein the combustor is a circular ring body, and the reformed gas path passes through an inner space of the circular ring body.

5. The hydrogen generating apparatus according to claim 2, wherein the reformed gas from a reforming catalyst disposed in the sidewall portion is sent to the reformed gas path after being turned around at the inner wall of the reformer.

6. The hydrogen generating apparatus according to claim 1, further comprising an evaporator that generates steam through heat exchange with the combustion exhaust gas, the steam being used to carry out steam reforming of the fuel in the reformer,
wherein the evaporator is arranged in contact with the reformer.

7. The hydrogen generating apparatus according to claim 6, wherein the evaporator is arranged downstream of the reformer in a flow direction of the combustion exhaust gas.

8. A fuel cell system comprising:
a reformer that carries out steam reforming of fuel and generates reformed gas containing hydrogen;
a combustor that heats the reformer, the reformer being arranged on a flame forming side of the combustor;
an exhaust gas path which covers surroundings of an outer wall of the reformer and through which combustion exhaust gas from the combustor flows;
a reformed gas path through which the reformed gas sent from the reformer toward the combustor flows;
an evaporator that generates steam through heat exchange with the combustion exhaust gas, the steam being used to carry out the steam reforming of the fuel in the reformer;
an air heat exchanger that includes a cylindrical air supply path arranged around the exhaust gas path, and that performs heat exchange between air flowing in the air supply path and the combustion exhaust gas flowing in the exhaust gas path; and
a fuel cell that generates electric power by employing the air from the air supply path and the reformed gas from the reformed gas path,
wherein the exhaust gas path is configured such that the combustion exhaust gas flows upward from the combustor and the reformed gas path extends downward towards the combustor and passes through the combustor, a gas flow inside the reformer in a portion thereof where the gas flow contacts an outer wall of the reformer is opposed to a flow of the combustion exhaust gas in the exhaust gas path in a portion thereof where the combustion exhaust gas contacts the outer wall of the reformer, and the combustor burns the reformed gas and the air, which have not contributed to a power generating reaction in the fuel cell.

9. The fuel cell system according to claim 8, wherein the reformer includes a sidewall portion that is formed by the outer wall and an inner wall.

10. The fuel cell system according to claim 9, wherein the inner wall and the outer wall are each a circular cylindrical body.

11. The fuel cell system according to claim 9, wherein the reformed gas from a reforming catalyst disposed in the sidewall portion is sent to the reformed gas path after being turned around at the inner wall of the reformer.

12. The fuel cell system according to claim 8, wherein the combustor is a circular ring body, and the reformed gas path passes through an inner space of the circular ring body.

13. The fuel cell system according to claim 8, wherein the evaporator is arranged in contact with the reformer.

14. The fuel cell system according to claim 8, wherein the evaporator is arranged downstream of the reformer in a flow direction of the combustion exhaust gas.

15. The fuel cell system according to claim 8, further comprising an air heat exchanger that includes a cylindrical inner wall, a cylindrical outer wall, and an air supply path defined between the cylindrical inner wall and the cylindrical outer wall, the air heat exchanger being arranged coaxially with the reformer in a surrounding relation to the reformer,
wherein the fuel cell is a solid oxide fuel cell,
wherein the reformer includes a circular cylindrical inner wall, a circular cylindrical outer wall, and a reforming catalyst disposed between the circular cylindrical inner wall and the circular cylindrical outer wall,
wherein the combustor that burns anode off-gas discharged from the solid oxide fuel cell, wherein the solid oxide fuel cell is disposed at a position spaced from both the reformer and the combustor along a center axis of the reformer, the reformer is disposed at a position spaced from the combustor, the circular cylindrical inner wall being arranged around a combustion space for a flame that is formed by the combustor, and an exhaust gas path of the combustor is formed by a first space between a lower end of the reformer and the combustor and by a second space between the circular cylindrical outer wall and the cylindrical inner wall.

16. The fuel cell system according to claim 15, wherein the reformer includes, above the reforming catalyst, a water evaporator that is formed by the circular cylindrical inner wall and the circular cylindrical outer wall, and a raw material and water both having passed through the water evaporator are supplied to the reforming catalyst.

17. The fuel cell system according to claim 16, wherein combustion exhaust gas of the combustor successively flows through the first space, the second space, and a space around the water evaporator in mentioned order.

18. The fuel cell system according to claim 16, wherein the water evaporator includes a flow path member that is disposed between the circular cylindrical inner wall and the circular cylindrical outer wall, and that forms a spiral flow path, and the raw material and the water spirally flow along the flow path member.

19. The fuel cell system according to claim 15, further comprising a flame guide that has a circular cylindrical shape, and that is abutted against a surface of the combustor in which a flame opening is formed, wherein the flame guide is arranged on an inner side of the circular cylindrical inner wall coaxially with the reformer in a surrounding relation to the combustion space above the flame opening.

20. The fuel cell system according to claim 19, further comprising a combustion exhaust gas guide that has a circular cylindrical shape, and that extends along a center axis of the reformer upward from a position spaced from the combustor, wherein the combustion exhaust gas guide is arranged on the inner side of the circular cylindrical inner wall coaxially with the reformer in a surrounding relation to the flame guide coaxially with the flame guide.

21. The fuel cell system according to claim 19, further comprising a combustion exhaust gas guide that has a circular cylindrical shape, and that extends along a center axis of the reformer upward from a position spaced from the combustor, wherein the combustion exhaust gas guide is arranged on the inner side of the circular cylindrical inner wall coaxially with the reformer in a surrounding relation to the flame guide coaxially with the flame guide, and the exhaust gas path of the combustor is formed by a third space between the flame guide and the combustion exhaust gas guide.

22. The fuel cell system according to claim 15, further comprising a combustion exhaust gas guide that has a circular cylindrical shape, and that extends along a center axis of the reformer upward from a position spaced from the combustor, wherein the combustion exhaust gas guide is arranged on an inner side of the circular cylindrical inner wall coaxially with the reformer.

23. The fuel cell system according to claim 20, further comprising a top plate that covers the combustor from above inside the reformer, wherein the top plate is arranged in or near a horizontal plane that includes an upper end of a region in which the reforming catalyst is filled.

* * * * *